United States Patent [19]

Noguchi

[11] 4,409,650
[45] Oct. 11, 1983

[54] AUTOMATIC POSITION CONTROLLING APPARATUS

[75] Inventor: Fumio Noguchi, Takarazuka, Japan

[73] Assignee: Shin Meiwa Industry Co., Ltd., Nishinomiya, Japan

[21] Appl. No.: 240,305

[22] Filed: Mar. 4, 1981

[51] Int. Cl.³ .................... G05B 19/42; G06F 15/46
[52] U.S. Cl. .................... 364/193; 219/124.34; 266/96; 318/568; 318/573; 364/169; 364/177
[58] Field of Search ............... 364/513, 474, 478, 193, 364/192, 191, 169, 177, 174, 477; 318/568, 573, 576, 577, 578; 219/124–134; 266/57–60, 62, 78, 96, 48

[56] References Cited

U.S. PATENT DOCUMENTS

| Re. 30,016 | 5/1979 | Hohn ............................. 364/513 X |
| 4,086,522 | 4/1978 | Engelberger et al. .......... 364/513 X |
| 4,258,425 | 3/1981 | Ramsey et al. ..................... 364/513 |
| 4,308,584 | 12/1981 | Arai ................................... 364/513 |
| 4,338,672 | 7/1982 | Perzley et al. ..................... 364/513 |

Primary Examiner—Joseph F. Ruggiero
Attorney, Agent, or Firm—Darby & Darby

[57] ABSTRACT

An automatic positioning apparatus comprises a smoothing means. The smoothing means is adapted to connect smoothly a 3-dimensional path based on the preceding and succeeding four taught points irrespective of a straight line or a curved line, while correcting a driving system with a delay of a system of a means being controlled, thereby to achieve a control in consideration of not only inertia but also a response characteristic.

22 Claims, 23 Drawing Figures

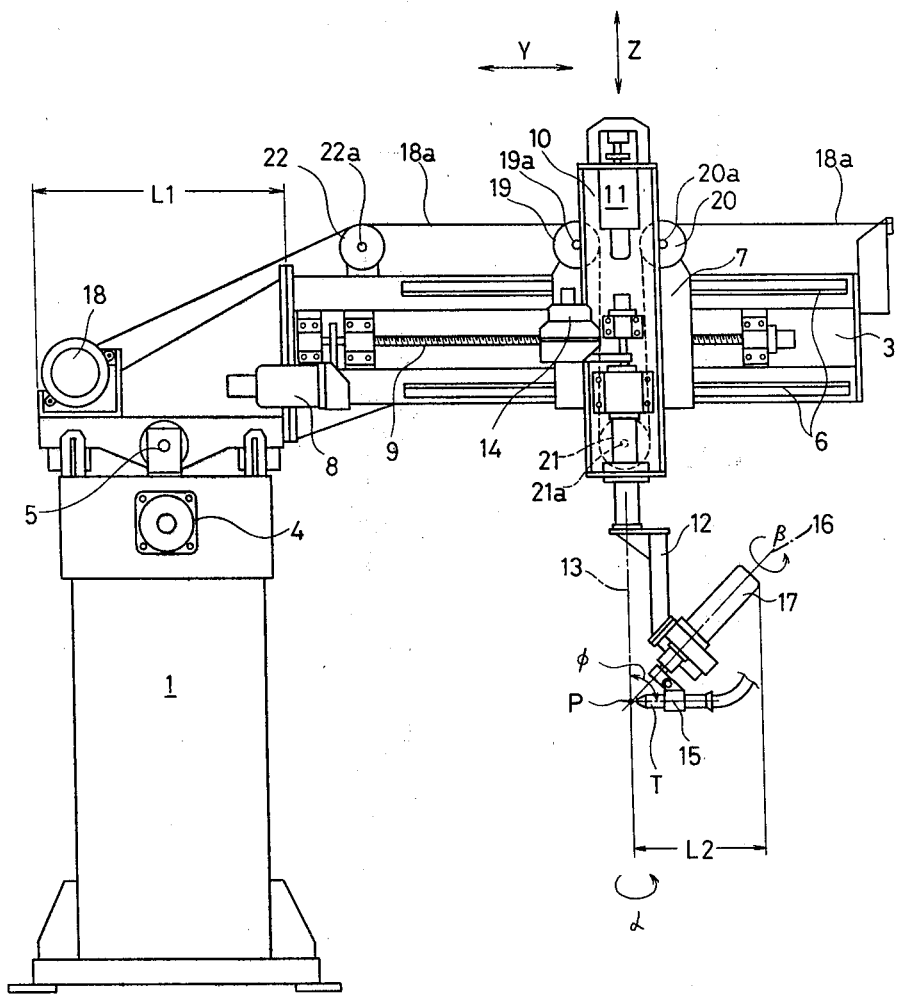

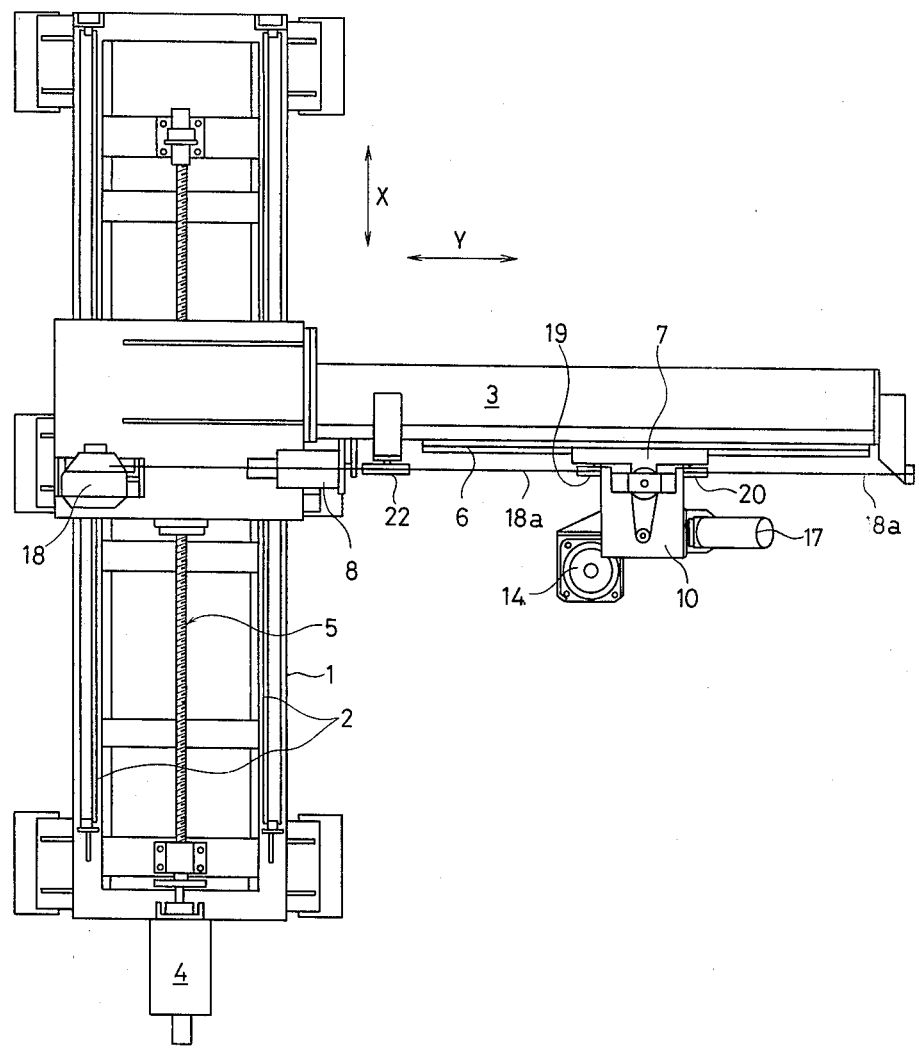

1

AUTOMATIC POSITION CONTROLLING APPARATUS

BACKGROUND OF THE INVENTION

1. Field of the Invention

The present invention relates to an automatic position controlling apparatus. More specifically, the present invention relates to an improved follow-up control in a position controlling apparatus using a playback system of a point-to-point type.

2. Description of the Prior Art

FIG. 1 is a perspective view showing one example of an automatic cutting apparatus which constitutes the background of the invention and wherein the present invention can be advantageously employed. The automatic cutting robot comprises a base 101 extending in a horizontal direction, i.e. an X axis direction and a first moving member 102 is borne on the base 101 to be movable in the X axis direction. The moving member 102 is integrally provided with a column 103 extending upright and a second moving member 104 is provided so as to be penetrated by the column 103 and to be movable in the vertical direction, i.e. in a Z axis direction. A beam 105 is further supported by the moving member 104 to be movable in the direction orthogonal to the X axis direction and the Z axis direction, i.e. in a Y axis direction. A shaft 106 is supported at the tip end of the beam 105 at the axis 106a extending in the same direction as the Z axis direction, the rotation angle of the shaft 106 being denoted by $\phi$. A fixture 108 or a cutting torch 109 is supported at the lower end of the shaft 106 by means of a balanced link means 107. The balanced link means 107 is structured such that the position of a working point 109a of the torch 109 may be at a predetermined point on the axis 106a even if an attitude angle $\psi$ of the torch 109 is variable and even in any value of the angle $\psi$. The fixture 108 is adapted such that the torch 109 fixed thereto may be rotatable about the axis 108a, the rotational angle thereof being represented by $\theta$. More specifically, the cutting robot 100 shown in FIG. 1 has sixth degrees of freedom of X, Y, Z, $\phi$, $\psi$ and $\theta$, and is additionally provided with driving systems for position control thereof and a control means such as a computer. A workpiece 200 is cut along a cutting line 201 of the workpiece 200 by means of the torch 109.

With a conventional robot using a playback system, a moving locus (path) of a means being controlled is prepared using linear or arcuate interpolation of the taught passing points, whereupon commanded position information of the means being controlled is obtained. According to such conventional approach, in addition to a problem of connection of paths, another problem was involved that the speed of paths and accuracy of positions are poor due to inertia and a response characteristic in operation of the means being controlled.

On the other hand, according to a robot of a continuous path system, such as disclosed in Japanese Patent Laying Open Gazette No. 31456/1976, it has been proposed that a new target value associated with a load or inertia of a driving system is evaluated based on the taught target values, whereby a follow-up control is achieved. However, the above described prior art can not be applied to a robot of a point-to-point type to which the present invention is directed. The reason is that in the case of a continuous path type the above described target values are represented as a function of time, whereas in the case of a point-to-point type the position information of the points to which the positions should be controlled and the speed information of the movement being controlled have been taught and therefore the target values have not been represented as a function of time. Accordingly, it is desired that there is provided a position controlling apparatus suited for a robot of a point-to-point type, which is implemented from a point of view entirely different from the above described prior art and that is capable of achieving a control with high speed and with high accuracy.

SUMMARY OF THE INVENTION

An automatic position controlling apparatus of a point-to-point type in accordance with the present invention is adapted to connect smoothly a three dimensional path irrespective of a straight line or a curved line based on the preceding and succeeding four taught points, while correcting a driving system having a delay of the system of the means being controlled, thereby to achieve a control in consideration of not only inertia but also a response characteristic. Therefore, the present invention is particularly effective in an apparatus for controlling the position of a means being controlled with high speed.

In a preferred embodiment of the present invention, consideration is given that it is not necessarily required to smoothly connect by means of such smoothing means, depending on the shape of a workpiece or the shape a cutting line but rather there could be a case where a position control of a conventional approach such as a linear interpolation, for example, is preferable. More specifically, in the preferred embodiment, an automatic position controlling apparatus of a playback type is provided wherein smooth connection is achieved by means of such smoothing means as described in the foregoing but, if it is not required, such smoothing means is rendered ineffective, so that position control can be made with accuracy by usual linear interpolation between the taught points.

Another preferred embodiment of the present invention is directed to an industrial robot, wherein the weight of an arm upon which a particularly large inertia acts is decreased as much as possible. Therefore, according to the preferred embodiment, the inertia of the arm in operation can be made small even when an accelerating speed of a working tool or a means being controlled is large. Accordingly, the same position accuracy as in the case of a robot of a small accelerating speed of a working tool or a means being controlled of the prior art can be maintained. Furthermore, according to the embodiment, a load acting on a motor for a column remains relatively unchanged both on the occasion of moving upward and downward and therefore the motor may be small sized and light weight.

In a further preferred embodiment of the present invention, an apparatus for positioning a workpiece suited for a particular workpiece is provided. More specifically, such positioning or supporting apparatus may be applied as an apparatus for positioning a workpiece as press formed, which is obtained by pouring a material settable as per the lapse of a period of time into a workpiece as press formed and by dipping a portion of a reinforcing material into the poured material and then forming a mold of the workpiece as press formed, whereupon the exposed portion of the reinforcing member from the above described material is mounted to a predetermined position of a supporting base. According to the workpiece positioning apparatus of the preferred embodiment, since the workpiece is positioned by mounting the mold including the above described material and the reinforcing member to the supporting base and covering the workpiece onto the mold, even in the case where the workpiece is a press formed workpiece which is of a very thin plate of such as an automobile body and is easily flexible, the same can always be positioned with accuracy and with ease. As a result, the preferred embodiment is particularly effective in automatically processing a workpiece of a very thin plate.

In still a further preferred embodiment of the present invention, the inventive automatic position controlling apparatus is applied to an improvement in a dummy torch such as in the case of a cutting or welding robot. According to the embodiment, a cutting or welding dummy torch is provided which comprises a hollow dummy torch main body, a tapered rod loosely fitted onto the tip end of the main body so as to be protrusile/retractile and to be urged to be protruded by a spring, and illuminating means including a light source mounted on the hollow portion of the main body and a light transmissive member guiding the light beam from the light source to the vicinity of the tip end of the rod. According to the dummy torch of the embodiment, since the rod is provided at the tip end of the main body so as to be protrusile/retractile and to be urged to be protruded by a spring, while the vicinity of the tip end of the rod is illuminated by the illuminating means, even when an operator erroneously operates the apparatus so that the tip end portion of the dummy collides with a workpiece, the rod is merely retracted against the spring, without damaging the dummy or the fixture or without bringing the position of a point being controlled to a wrong position. In addition, even when illumination in a factory is not sufficient or a workpiece is glossy, it is very easy to operate so as to coincide the position of a point being controlled with a position on the line with the naked eye, with the result that a remarkable advantage is brought about.

Accordingly, a principal object of the present invention is to provide an improved automatic position controlling apparatus of a point-to-point type and of a playback type, which comprises smoothing means for smoothly connecting the point positions in controlling the position between the point positions.

Another aspect of the present invention resides in an automatic position controlling apparatus which is capable of rendering ineffective the above described smoothing means as necessary.

A further aspect of the present invention resides in a position controlling apparatus particularly suited for an industrial robot adapted for moving a member being controlled with a high speed.

Still another aspect of the present invention resides in provision of a dummy torch suited in a case where an automatic position controlling apparatus is applied as a cutting robot or a welding robot.

Still a further aspect of the present invention resides in provision of a workpiece positioning apparatus for assuredly positioning and supporting a member being worked or a workpiece in the case where an automatic position controlling apparatus is applied as an industrial robot of such as an automatic cutting apparatus.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 9A and 9B are views showing an automatic cutting apparatus as one example of an automatic position controlling apparatus in accordance with another embodiment of the present invention, wherein FIG. 9A is a side view and FIG. 9B is a plan view;

DESCRIPTION OF THE PREFERRED EMBODIMENTS

Figure 1:
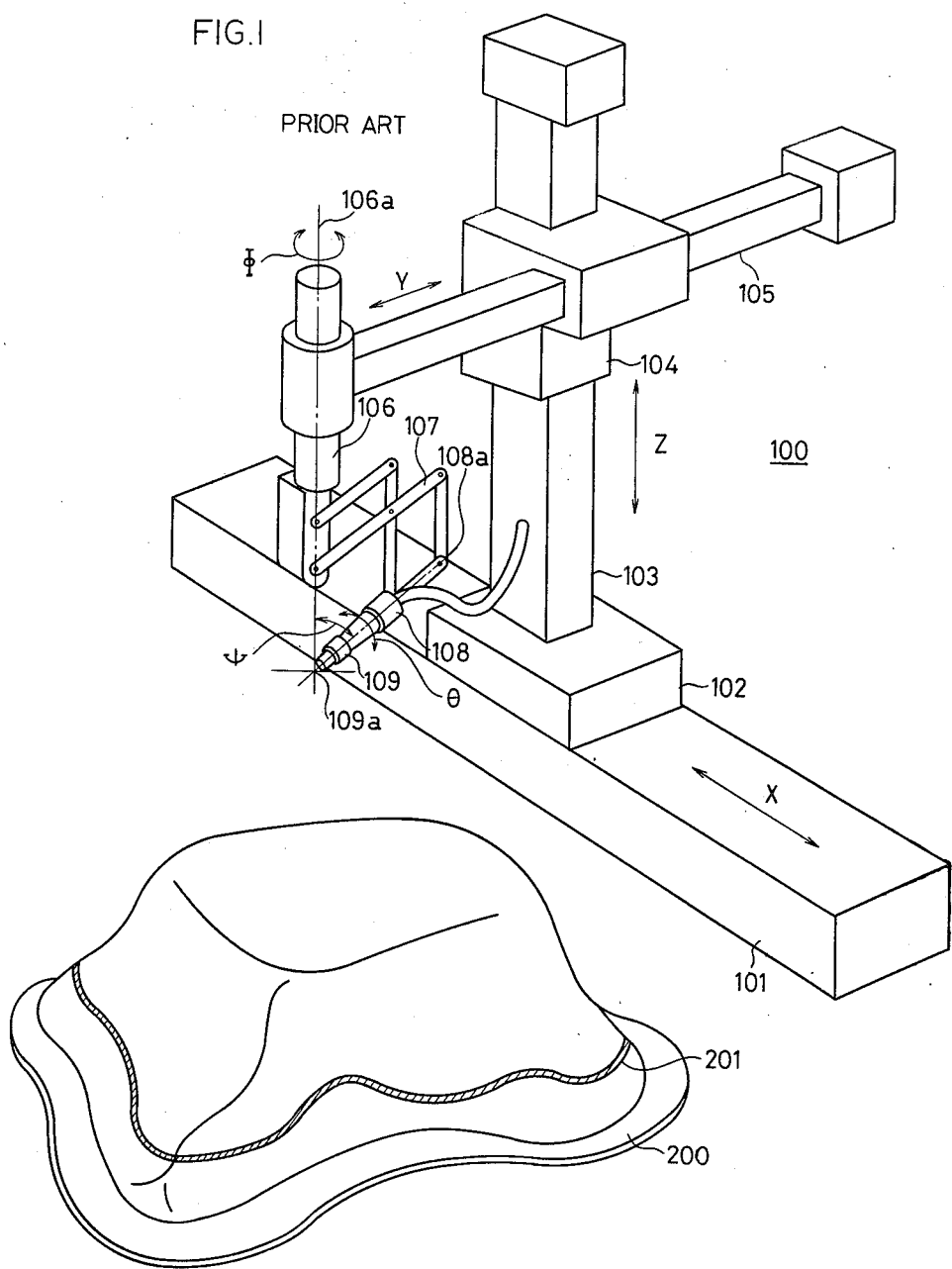
FIG. 1 is an automatic cutting apparatus as one example of an automatic position controlling apparatus which constitutes the background of the invention and wherein the present invention can be advantageously employed.
Figure 2:
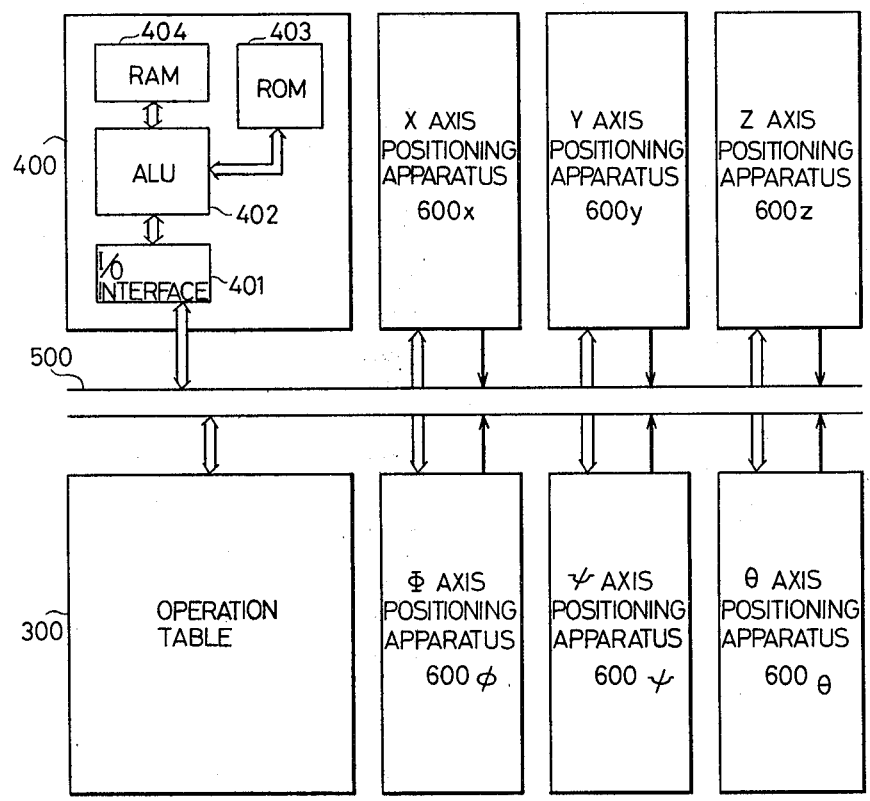
FIG. 2 is a block diagram showing an outline of a position controlling apparatus wherein the present invention can be advantageously employed.

FIG. 2 is a block diagram showing an outline of an embodiment of the present invention for controlling the position of the robot 100 shown in FIG. 1. Referring to FIG. 2, an operation table 300, a computer 400 and axis positioning apparatuses $600_x$, $600_y$, $600_z$, $600_{100}$, $600_\psi$ and $600_\theta$ are coupled to a common bus 500.

Figure 3:
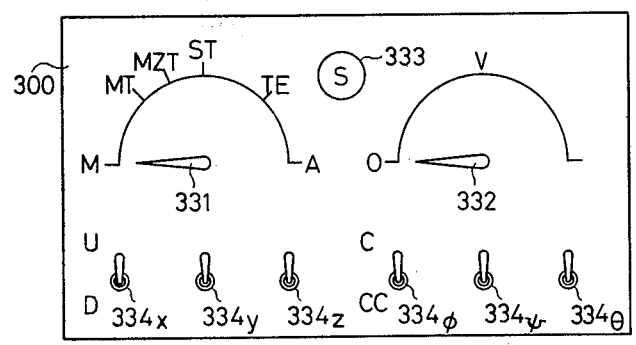
FIG. 3 is a view diagrammatically showing one example of an operation table.

The operation table 300 is shown in detail in FIG. 3 and comprises a mode selecting switch 331. The mode selecting switch 331 is adapted to set a manual mode at the position "M", a teaching mode through manual operation at the position "MT", a teaching mode through operation of an optical means for detecting a cutting line 201 of the workpiece 200 shown in FIG. 1 at the position "ST", a test mode at the position "TE" and an automatic mode at the position "A". The signals corresponding to the respective modes are obtained through the bus 500 from the mode selecting switch 331. The operation table 300 further comprises a cutting speed commanding switch 332 and a start button switch 333. The operation table 300 further comprises manual operation switches $334_x$, $334_y$, $334_z$, $334_\phi$, $334_\psi$ and $334_\theta$ for the respective axes. These switches are structured such that when the same are turned to the "U" side the torch 109 is moved in the direction away from the origin point along the respective control axes, whereas when the same are turned to the "D" side the torch is moved in the direction toward the original point along the respective control axes. The switches $334_\phi$, $334_\psi$ and $334_\theta$ are further adapted such that when the same are turned to the "C" side the rotation is controlled about the respective axes in the clockwise direction whereas when the same are turned to the "CC" side the rotation is controlled in the counterclockwise direction.

As well known, the computer 400 comprises an input/output interface circuit 401, an arithmetic logic unit 402, a read only memory 403 and a random access memory 404.

As the operation table 300 shown in FIG. 3 is operated, the commanded position information is applied from the computer 400 shown in FIG. 2 to the respective axis positioning apparatuses $600_x$ to $600_\theta$. At the same time, signals representing that the commanded position is reached are fedback from the these positioning apparatuses $600_x$ to $600_\theta$.

Figure 4:
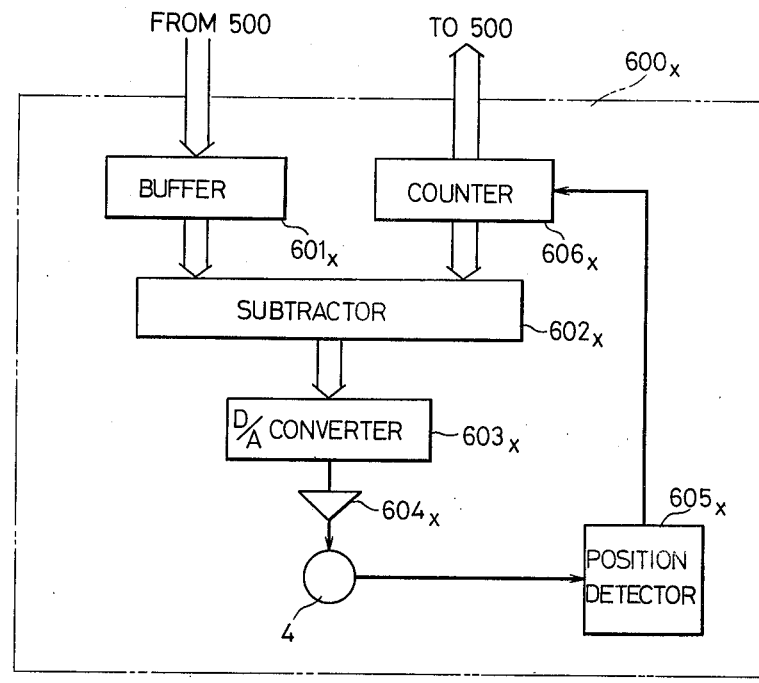
FIG. 4 is a block diagram showing a positioning apparatus of an X axis.

FIG. 4 is a block diagram of the X axis positioning apparatus $600_x$ representing the respective axis positioning apparatuses $600_x$ to $600_\theta$. Since the remaining positioning apparatuses $600_y$ to $600_\theta$ are structured in substantially the same manner as shown in FIG. 4, only the X axis positioning apparatus $600_x$ is described, while a description of the other axes positioning apparatuses will be omitted. The positioning apparatus $600_x$ comprises a buffer register $601_x$ for receiving commanded position information from the bus 500, i.e. the computer 400. The buffer $601_x$ is loaded with the commanded position information sent from the computer 400 at the time interval t. The output from the buffer $601_x$ is applied as one input to a subtractor $602_x$. The other input of the subtractor $602_x$ is supplied with the output of a counter $606_x$. The counter $606_x$ receives a position pulse signal from a position detector $605_x$ to be described subsequently (including an incremental encoder, for example) so that the output therefrom represents the current position. The output from the subtractor $602_x$ is applied to a digital/analog converter $603_x$ as a difference between the buffer $601_x$ (a target point position) and the counter $606_x$ (the current position). The output from the digital/analog converter $603_x$ is applied to a servo-amplifier $604_x$ and the output from the servo-amplifier $604_x$ is applied to a well-known control means for controlling the rotation of a motor 4. Accordingly, these components $602_x$, $603_x$, $604_x$, $605_x$ and $606_x$ constitute an X axis driving system. A signal (data) of the position as driven by the driving system is further provided from the counter $606_x$ through the bus 500 to the computer 400.

Figure 5:
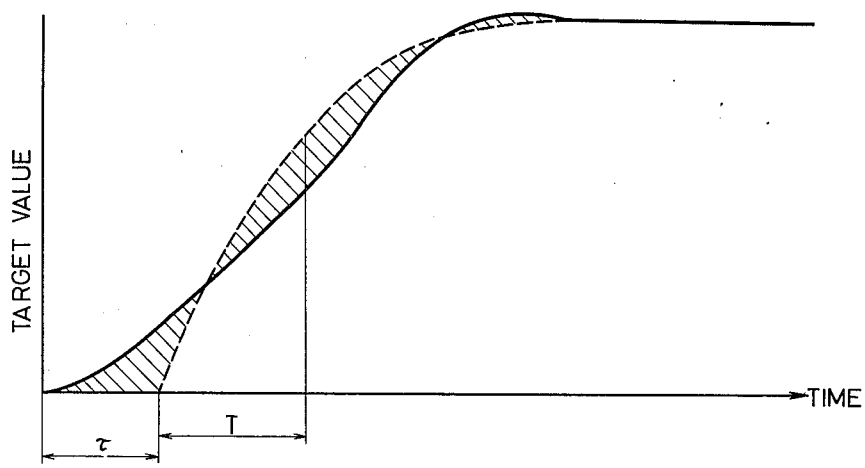
FIG. 5 is a graph showing one example of a response characteristic of a positioning apparatus, wherein the abscissa indicates time and the ordinate indicates a target value.

Generally such positioning apparatuses employ a feedback loop. A response characteristic of such driving system involves a time lag of higher order as shown by the solid line in FIG. 5. For the purpose set forth in the following, such characteristic is assumed to be similar to the time lag T of first order and the dead time $\tau$ as shown by the dotted line in FIG. 5 for simplicity. These values are determined so that the error may be minimized by actual measurement by the apparatuses or simulation, for example, the area of the hatched portion in FIG. 5 may be minimized, or determined by the method of least squares.

Assuming that the input is $X_{(s)}$ and the output is $Y_{(s)}$, then the transfer function $G_{(s)}$ of the driving system assumed to be similar may be expressed by the following equation:

$$G_{(s)} = \frac{Y_{(s)}}{X_{(s)}} = \frac{e^{-\tau s}}{1 + Ts} \quad (1)$$

By evaluating the input $X_{(s)}$ by the equation (1), $X_{(s)} \cdot e^{-\tau s} = Y_{(s)}(1 + Ts)$ is obtained. By converting this to a real time system, the following equation is obtained:

$$x_{(t-\tau)} = y_{(t)} + T \cdot \left(\frac{dy_{(t)}}{dt}\right) \quad (2)$$

Thus it follows that if a desired output $Y_{(t)}$ is expressed by some formula, conversely $$Y_{(t)} + T \times \left(\frac{dy_{(t)}}{dt}\right)$$

may be inputted with the time advanced by the dead time $\tau$. The detail thereof will be described subsequently.

On the other hand, it is necessary to obtain a formula for smoothingly connecting the respective taught points.

Figure 6:
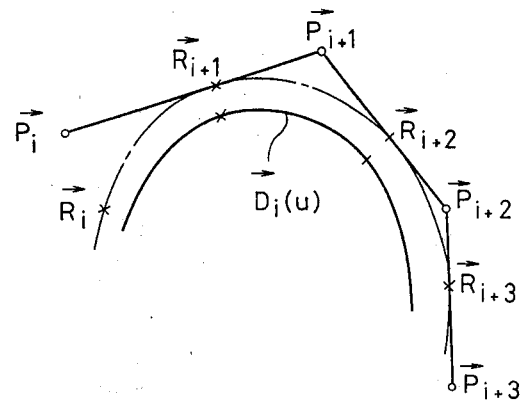
FIG. 6 is a graph for explaining an approach for smoothly connecting the path.

FIG. 6 is a view for depicting a method for smoothly connecting the path. Referring to FIG. 6, it is assumed that the position coordinates of the respective taught points are a vector representation $\overline{R}_i(i; 1$ to $n)$. Now a curved line portion is represented as $\overline{D}_{i,n}(u)$ using the vector representation, where the first subscript i denotes the i-th connecting element and the second subscript n denotes a curved line portion formed at the n-th portion, u being a parameter which is changeable between 0 and 1.

With the above described convention, assuming that $\overline{D}_{i,n}(u)$ is a locus of a pseudo gravity point when u is moved with a division of a weight $\omega(\tau)$ with respect to the curved line components $\overline{D}_{i,n-1}(u)$ and $\overline{D}_{i+1,n-1}(u)$, $\overline{D}_{i,n}(u)$ may be expressed by the following equation (3):

$$\vec{D}_{i,n}(u) = \quad (3)$$

-continued $$\left\{ \int_u^1 \omega(\tau) \vec{D}_{i,n-1(\tau)} d\tau + \int_0^u \omega(\tau) \vec{D}_{i+1,n-1(\tau)} d\tau \right\} \div$$

$$\left\{ \int_u^1 \omega(\tau) d\tau + \int_0^u \omega(\tau) d\tau \right\}.$$

Assuming that $\omega(u)$ meets $$\int_0^1 \omega(\tau) d\tau = 1$$

and further assuming the first taught point to be $R_i$, and further assuming that the curved line portion at the 0-th portion may be expressed by the following equation:

$$\vec{D}_{i,0}(u) = \vec{R}_i \cdot f_{0,0}(u) \quad f_{0,0}(u) = 1 \quad (4)$$

then the curved line portion of the first section may be expressed by the following equation (5):

$$\vec{D}_{i,1}(u) = \vec{R}_i \cdot f_{0,1}(u) + \vec{R}_{i+1} \cdot f_{1,1}(u) \quad (5)$$

where $f_{0,1}(u) = \int_u^1 \omega(\tau) d\tau = 1 - u$ $f_{1,1}(u) = \int_0^u \omega(\tau) d\tau = u$ Likewise, the curved line portion of the n-th section may be expressed by the following equation (6):

$$\vec{D}_{i,n}(u) = \sum_{j=0}^n \vec{R}_{i+j} \cdot f_{j,n}(u) \quad (6)$$

Since attention has been paid to the formula of the curved line portion at the third section, by expressing the same using u as a parameter, the following equation (7) is obtained:

$$\vec{D}_{i,3}(u) = \vec{R}_i \cdot f_{0,3}(u) + \vec{R}_{i+1} \cdot f_{1,3}(u) + \vec{R}_{i+2} \cdot f_{2,3}(u) + \vec{R}_{i+3} \cdot f_{3,3}(u) \quad (7)$$

where $f_{0,3} = \frac{(1 - 3u \times 3u^2 - u^3)}{6}$ $f_{1,3} = \frac{(4 - 6u^2 + 3u^3)}{6}$ $f_{2,3} = \frac{(1 + 3u + 3u^2 - 3u^3)}{6}$ $f_{3,3} = \frac{u^3}{6}$ where $0 \leq u \leq 1$.

Now referring to the above described equation (7), the curved line portion was obtained from the $\vec{R}_i$ point; however, this curved line does not pass through the point $\vec{R}_i$, as shown in FIG. 6. As a matter of practice, what is required is a formula of a curved line which passes through the taught points and is sufficiently smooth. In order to achieve such processing, conversely the reference point $\vec{P}_i$ on calculation may be evaluated from the taught point $\vec{R}_i$, whereupon the value of the reference point $\vec{P}_i$ may be substituted.

For the purpose of evaluating the reference point $\vec{P}_i$, considering a case of u=0 in the above described equation (7), then the following equation is obtained:

$$6 \cdot \vec{P}_i = \vec{R}_i + 4 \cdot \vec{R}_{i+1} + \vec{R}_{i+2} \quad (8)$$

Thus by solving simultaneous equations concerning i, $\{\vec{P}_i\}$ is obtained from $\{\vec{R}_i\}$; however, since an error caused on $\vec{P}_i$ by $\{\vec{R}_i\}$ at a remote point is minor as a matter of practice, it would be sufficient to consider the taught point $\vec{R}_i$ at approximately nine preceeding and succeeding points with respect to the reference point $\vec{P}_i$. An approximate solution of the simultaneous equations at that time would be:

$$\vec{P}_i = \sqrt{3} \left( \vec{R}_i + \sum_{j=1}^9 (\vec{R}_{i+j} + \vec{R}_{i-j}) \alpha^j \right) \quad (9)$$

where $\alpha = \sqrt{3} - 2$

Referring to the equation (9), $\vec{P}_i$ is evaluated by calculating this in succession with respect to i=1 to n. However, as for a vector $\vec{R}_{i \pm j}$ outside the boundary where nothing has been taught, appropriate values are substituted by substituting the points on the extension of the taught points. Now the formula of the path for $\vec{D}_{i(u)}$ of a sufficient smooth connection of the respective portions extending through the points $\vec{P}_i$ to the point $\vec{R}_i$ evaluated by the previously described equation (9) may be expressed by the following equation (10):

$$\vec{D}_i(u) = f_0 \times \vec{P}_i + f_1 \times \vec{P}_{i+1} + f_2 \times \vec{P}_{i+2} + f_3 \times \vec{P}_{i+3} \quad (10)$$

where $f_0 = \frac{1 - 3u + 3u^2 - u^3}{6}$ $f_1 = \frac{4 - 6u^2 + 3u^3}{6}$ $f_2 = \frac{1 + 3u + 3u^2 - 3u^3}{6}$ $f_3 = \frac{u^3}{6}$ $0 \leq u \leq 1$ Meanwhile, such formula for a path is well-known in various papers for a computer-aided design.

Meanwhile, referring to the above described equation (10), even if the value of $\vec{D}_i(u)$ is evaluated by substituting u at predetermined intervals between $0 \leq u \leq 1$, there is no guarantee that the moving distances on the path becomes equidistant and therefore the same is extremely inconvenient when the speed and the position are controlled only with a position command as shown in the above described equation (2). Accordingly, in the embodiment shown a new variable t is used in place of u and the following conversion is made:

$$u = at^3 + bt^2 + ct \quad (11)$$

By determining the variable t at equidistant intervals, then the commanded positions on the path also become equidistant intervals. The above described equation (10) is thus deformed. Therefore, a, b and c are determined so that $(d\vec{D}/dt)$ may be a desired value $V_c$ at the three points 0, ½ and 1 during a period of u. The values of the variable t when u is 0, ½ and 1 are assumed to be $t_0$, $t_1$ and $t_2$, respectively, and the values of $(d\vec{D}/du)$ are accordingly assumed to be $V_0$, $V_1$ and $V_2$, respectively, then from the above described equation (11):

$$0 = at_0^3 + bt_0^2 + ct_0$$
$$\frac{1}{2} = at_1^3 + bt_1^2 + ct_1 \quad (12)$$
$$1 = at_2^3 + bt_1^2 + ct_2$$

On the other hand, from the above described equation (10) the following equation (13) is obtained:

$$\frac{d\vec{D}}{du} = \frac{1}{2}\{(\vec{P}_{i+3} - 3\vec{P}_{i+2} + 3\vec{P}_{i+1} - \vec{P}_i) \times u^2 + \quad (13)$$
$$(2\vec{P}_{i+2} - 4\vec{P}_{i+1} + 2\vec{P}_i) \times u + (\vec{P}_{i+2} - \vec{P}_i)\}$$

By substituting the value of u in the equation (13), the following is obtained:

$$\vec{V}_0 = \frac{\vec{P}_2 - \vec{P}_0}{2}$$
$$\vec{V}_1 = \frac{\vec{P}_{i+3} + 5\vec{P}_{i+2} - 5\vec{P}_{i+1} - \vec{P}_i}{8} \quad (14)$$
$$\vec{V}_2 = \frac{\vec{P}_{i+3} - \vec{P}_i}{2}$$

From the above described equation (14) and the following equation (15), the equation (16) is obtained:

$$\frac{d\vec{D}}{dt} = \frac{d\vec{D}}{du} \cdot \frac{du}{dt}$$
$$\frac{d\vec{D}}{dt} = \frac{d\vec{D}}{du} \cdot (3at^2 + 2bt + c) \quad (15)$$

$$V_c = \vec{V}_0 \times (3at_0^2 + 2bt_0 + c)$$
$$V_c = \vec{V}_1 \times (3at_1^2 + 2bt_1 + c) \quad (16)$$
$$V_c = \vec{V}_2 \times (3at_2^2 + 2bt_2 + c)$$

By determining the coefficients a, b and c satisfying the above described equations (12) and (16) by using a convergence operation, for example, the formula for a path in a desired form is obtained by the following equation (17):

$$\vec{D}_{(t)} = \frac{1}{6.0}\{(\vec{P}_{i+3} - 3\vec{P}_{i+2} + 3\vec{P}_{i+1} - \vec{P}_i)(at^3 + bt^2 + ct)^3 + \quad (17)$$
$$(3\vec{P}_{i+2} - 6\vec{P}_{i+1} + 3\vec{P}_i)(at^3 + bt^2 + ct)^2 +$$
$$(3\vec{P}_{i+2} - 3\vec{P}_i)(at^3 + bt^2 + ct) +$$
$$(\vec{P}_{i+2} + 4 \cdot \vec{P}_{i+1} + \vec{P}_i)$$

-continued
$$\frac{d\vec{D}_{(t)}}{dt} = \frac{1}{2.0}\{(\vec{P}_{i+3} - 3\vec{P}_{i+2} + 3\vec{P}_{i+1} - \vec{P}_i)(at^3 + bt^2 + ct)^2 +$$
$$(2\vec{P}_{i+2} - 4\vec{P}_{i+1} + 2\vec{P}_i)(at^3 + bt^2 + ct) +$$
$$(\vec{P}_{i+2} - \vec{P}_i)\}(3at^2 + 2bt + c)$$

As is seen from the equation (17), by allotting the intervals of an appropriate time period t and making calculation of the above described equation (17) based on the time intervals for renewing the commanded values and the speed $V_c$ on the desired path and by substituting the same in the above described equation (2), the commanded values with the time lag of first order of the driving system considered can be calculated.

Figure 7:
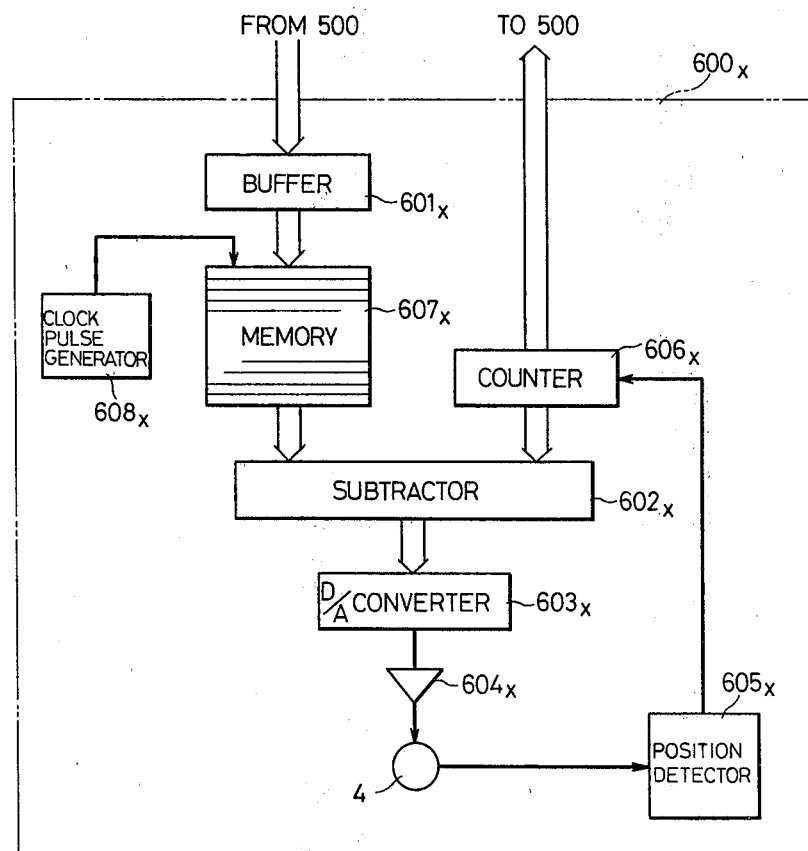
FIG. 7 is a block diagram showing one example of an X axis positioning apparatus as corrected to be capable of treating a dead time.

FIG. 7 shows one example of a positioning apparatus adapted for processing the dead time. In FIG. 7 as well, only the X axis positioning apparatus $600_x$ is shown as representing the respective axis positioning apparatus. It is pointed out that the positioning apparatus shown is different from that shown in FIG. 4 in the following respects. More specifically, the FIG. 7 positioning apparatus is provided with a memory $607_x$ and a clock pulse generator $608_x$ provided associated therewith. The clock pulse generator $608_x$ is structured to generate a clock pulse of a repetition frequency with which the dead time $\tau$ can be fully counted (say a period of 1 ms). On the other hand, the memory $607_x$ is structured to comprise storing regions of the number (say 100) obtained by dividing the time period $(\tau_0 - \tau_x;$ say 100 ms) by the period of the above described clock pulse, where $\tau_0$ is a reference dead time and $\tau_x$ is a dead time of the X axis driving system. Furthermore, the memory $607_x$ is adapted such that the content is shifted to a lower stage on a one stage by one stage basis in succession as a function of the clock pulse obtained from the clock pulse generator $608_x$ and the content in the lowermost stage is applied as an input to the subtractor $602_x$. The uppermost stage of the memory $607_x$ is loaded with the content of the buffer $601_x$ as a function of the clock pulse.

By adopting such circuit as shown in FIG. 7 as the positioning apparatuses of the respective axes, it follows that when the commanded position information of the respective axes is obtained simultaneously from the computer 400 the respective axis driving systems are supplied with the corrected commanded positions with a time delay of a difference from the difference dead time $\tau_0$, with the result that positioning can be achieved with respect to the respective axes in consideration of the dead time of the respective axes.

Figure 8:
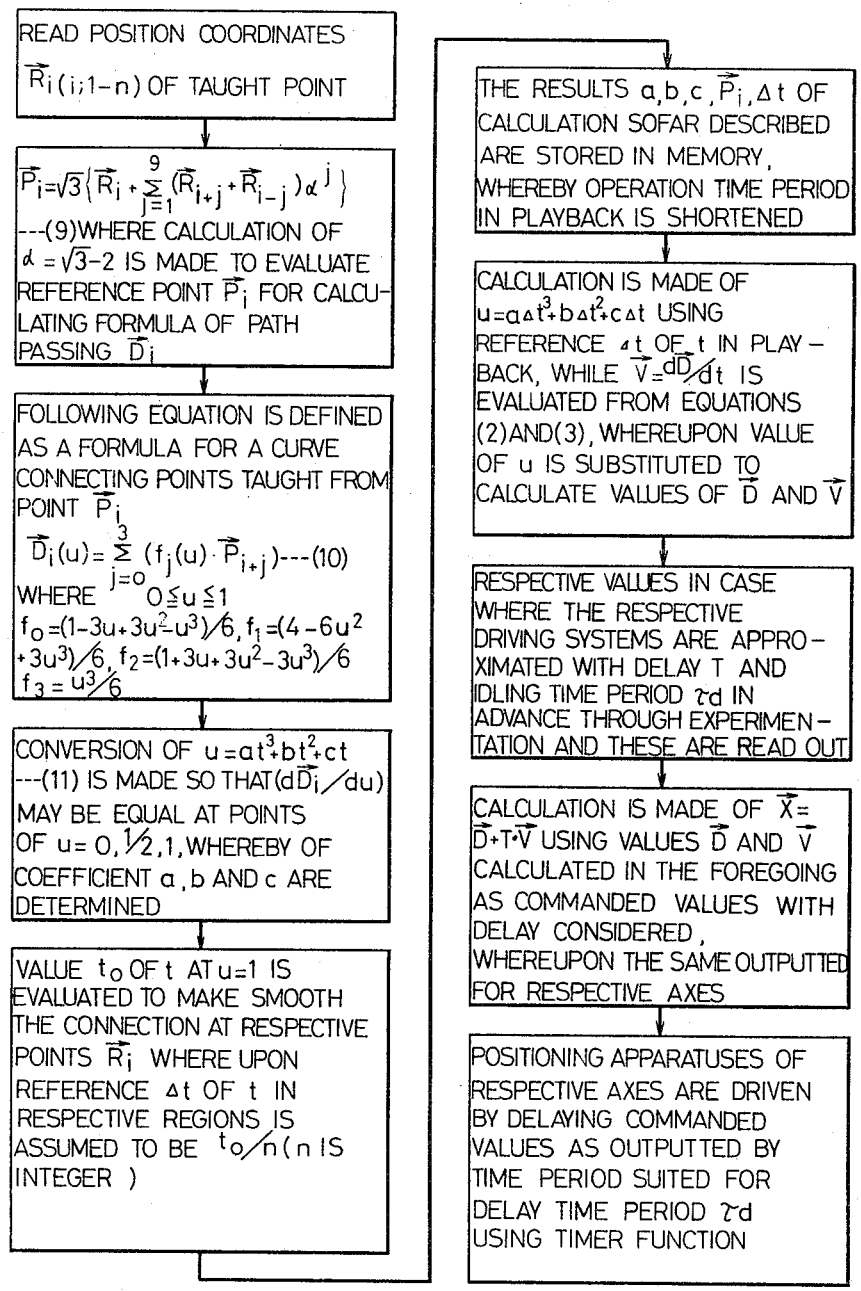
FIG. 8 is a flow diagram for depicting an operation of one embodiment of the present invention.

Meanwhile, FIG. 8 is a flow diagram showing such operation. The above described operation would be better appreciated with reference to FIG. 8.

FIG. 9A is a side view showing another example of an automatic cutting apparatus wherein the present invention can be advantageously employed and FIG. 9B is a plan view of the FIG. 9A embodiment. The automatic cutting robot shown comprises a base 1 extending in the horizontal direction, i.e. the X axis direction and two rails 2 and 3 are provided on the base 1 extending in the X axis direction. An arm 3 is supported on the rails 2 so as to be movable in the X axis direction. A motor 4 is provided on the side of the base 1 extending in the X axis direction, so that the arm 3 is controllably moved in the X axis direction through a well-known power transmitting mechanism (a ball screw) 5. Two rails 6 and 6 are provided on the side surface of the arm 3 so as to extend in the Y axis direction. A moving member 7 is supported on the rails 6 so as to be movable in the Y axis direction. The moving member 7 is controllably moved in the Y axis direction through a power transmitting mechanism (a ball screw) 9 by means of a motor 8 provided on the arm 3. A column 10 is supported on the moving member 7 so as to be movable in the Z axis direction. The column 10 is controllably moved in the Z axis direction through a power transmitting mechanism (not shown) by means of a motor 11 provided at the top thereof. A rotating member 12 is supported at the lower end of the column 10, so that the rotating member 12 is controllably rotated about the $\alpha$ axis by means of a motor 14 provided on the column 10. A fixture 15 for holding a torch T is supported at the free end of the rotating member 12. The torch fixture is provided to be rotatable about the $\beta$ axis 16 which is an axis inclined by 45° with respect to the $\alpha$ axis 13, so that the same is controllably rotated about the $\beta$ axis by means of a motor 17 mounted on the rotating member 12. Meanwhile, the torch T is held in an attitude inclined by say 45° with respect to the $\beta$ axis 16. These two axes 13 and 16 are disposed to intersect at the point P, so that the point P may coincide with the cutting point of the torch T. By positioning the working point P of the torch T on the above described two axes 13 and 16, the inventive automatic position controlling apparatus is particularly effective when the same is practiced as a cutting apparatus. More specifically, such cutting apparatus need be of a high speed movement type rather than of a low speed movement type of such as a conventional welding apparatus. If the working point P of the torch T had not been provided on these rotation axes 13 and 16, it could have happened that a movement of the column 10 in the X axis or Y axis direction need be of a very high speed with respect to the movement of the working point P, with the result that an increase of inertia could have been caused. Therefore, according to the embodiment, the working point P of the torch T is positioned on the above described two rotation axes 13 and 16.

A well-known spring balancer 18 is provided at one end of the arm 3. The spring balancer 18 comprises an extending member (wire) 18a extending along the arm 3. A first and second pulleys are provided so as to be rotatably supported by the shafts 19a and 20a, respectively, at both ends in the width direction at the top of the moving member 7. A third pulley 21 is provided to be supported rotatably by a shaft 21a at the lower portion of the column 10. An auxiliary pulley 22 is further provided to be supported rotatably by a shaft 22a at the position above the arm 3 and closer to the balancer 18 than the moving member 7. The extending member 18 is fixed at the end thereof to the other end portion of the arm 3 and is entrained in succession about the pulleys 22, 19, 21 and 20 from the side of the balancer 18. The winding force of the extending member 18a of the spring balancer 18 has been set to be approximately a half of the total weight of the column 10 and the respective components supported thereby, such as the rotating member 12, the torch fixture 15 and the torch 10.

In the cutting robot as shown in FIGS. 1 and 2, a workpiece (not shown) is fixed to a flat table (not shown) and the respective motors 4, 8, 11, 14 and 17 are controlled, so that the torch T is maintained in an attitude most suited to a workpiece and a cutting point, i.e. a point P is brought along a cutting line of a workpiece, whereby a workpiece can be cut. At that time the total weight of the column 10 and the respective components supported thereby and the winding force of the spring balancer 18 have been substantially balanced without regard to the wound amount of the extending member 18a and, therefore, the load acting on the motor 11 for moving the column 10 upward and downward (in the Z axis direction) is very little changed in either case of the upward movement and the downward movement. Accordingly, the motor 11 may be small sized. Furthermore, the arm 3 is formed integrally with the carriage movable in the X axis direction on the base 1 so as to long extend in the Y axis direction and the moving member 7 is supported on the arm 3 so as to be movable in the Y axis direction. Therefore, as compared with a structure in which the arm 3 is adapted to be movable in the Y axis direction with respect to the carriage moving in the X axis direction on the base 1 and the moving member 7 is made integral with the end portion of the arm 3, the weight of the arm may be small and accordingly inertia of the arm 3 on the occasion of a moving operation in the X axis direction can be decreased. Furthermore, inertia of the moving member 7 on the occasion of a moving operation on the Y axis direction is also small. Furthermore, since the arm 3 is adapted to be supported on the base 1 at one end, the total of the length L1 of the portion for supporting the arm 3 on the base 1 and the maximum radius L2 of the rotating member 12 and the torch fixture 15 with the same rotating about the axis 13 is relatively short, as compared with a case where both ends are supported, and accordingly the weight of the arm 3 can be further decreased. Therefore, even in the case where the accelerating speed of the torch T is large, inertia of the arm 3 on the occasion of a moving operation in the X axis direction can be further decreased and hence an influence of the inertia exerted upon the position accuracy can be minimized.

The cutting robot shown in FIGS. 1 and 2 has five degrees of freedom of X, Y, Z, $\alpha$ and $\beta$ and is additionally provided with the driving systems for position control and a control means such as a computer and an operation table. The operation table 300 may be of the same type as shown in FIG. 3; however, the embodiment shown employs the structure to be described in the following. Furthermore, the embodiment shown is structured to comprise the respective axis positioning apparatuses (corresponding to the above described five axes), as shown previously in FIG. 4 or 7.

Figure 10:
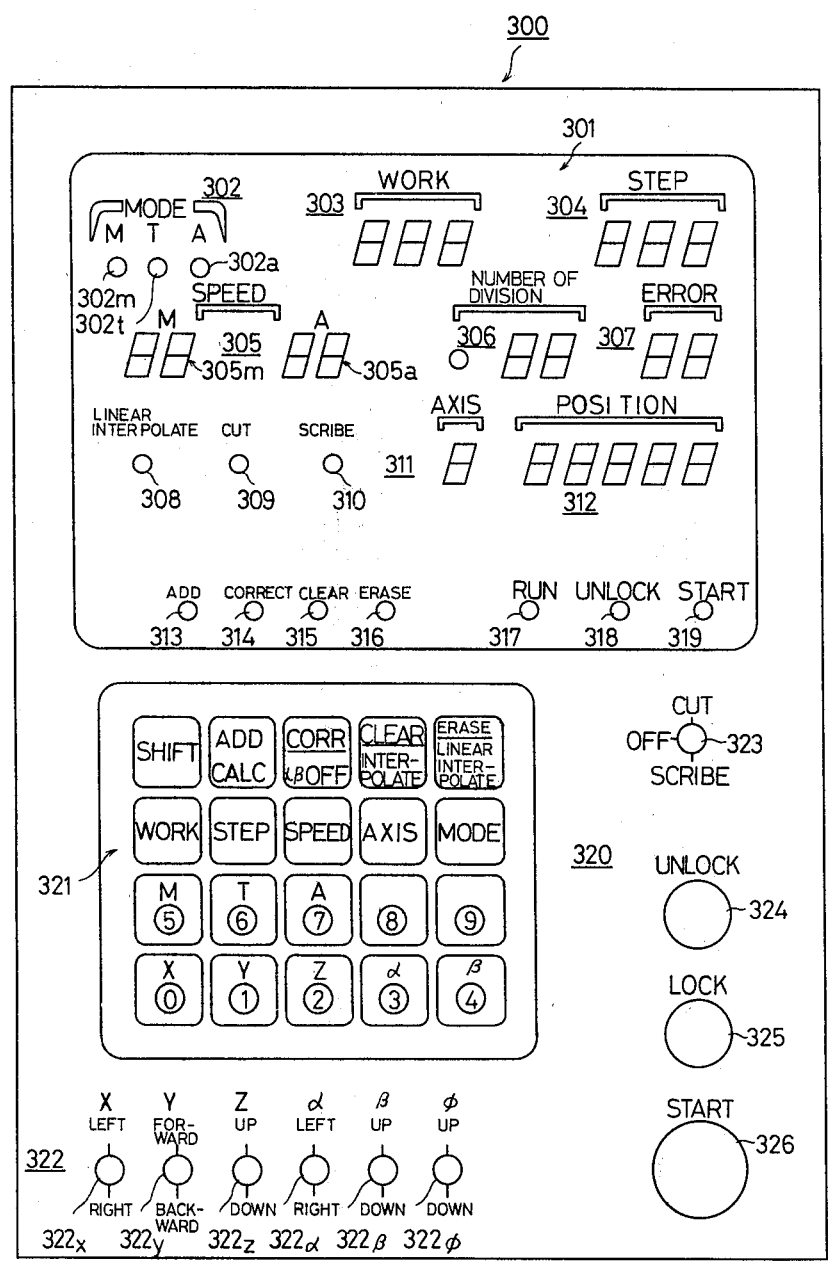
FIG. 10 is a view diagrammatically showing another example of an operation table.

In the embodiment shown, the operation table 300 comprises an operation portion 320 and a display portion 301, as shown in FIG. 10. The operation portion 320 is aimed to enable manual operations of cutting robot shown in FIGS. 9A and 9B through operation of the key switches. Accordingly, a user program can be taught or entered through operation of the operation table 300. The operation portion 320 comprises a keyboard 321. The keyboard 321 comprises a several key switches including ten keys. The "SHIFT" key of the keyboard 321 is aimed to select the function with respect to the key switches wherein the functions thereof are indicated on the key top in two rows, so that when the "SHIFT" key is operated the function indicated on the upper row may be selected. The operation portion 320 further comprises manual operation switches 322 for use in a manual mode (teaching mode). These manual operation switches 322 include switches $322_x$, $322_y$, $322_z$, $322_\alpha$, $322_\beta$ and $322_\phi$ for the respective axes X, Y, Z, $\alpha$, $\beta$ and $\phi$ shown in FIGS. 9A and 9B. Although not shown in detail, these manual operation switches $322_x$ to $322_\phi$ may be of a toggle switch that can assume say three positions, as in the case of the switches $334_x$ to $334_\theta$ shown previously in FIG. 3. The switches $322_x$, $322_y$ and $322_z$ serve to move the torch T in the direction away from the original point of the respective axes along the respective corresponding controlling axes when the same are turned upward and to move the torch in the direction toward the origin point when the same are turned downward. The switches $322_\alpha$, $322_\beta$ and $322_\phi$ serve to cause rotation in the clockwise direction about the corresponding axes when the same are turned upward and contrary to cause rotation in the counterclockwise direction when the same are turned downward. The operation portion 320 further comprises a selection switch 323, so that the selection switch 323 may select the operation of "CUTTING", "OFF" or "SCRIBING" through selection thereof. The switch 324 is aimed to release the state as locked by the switch 325. The start switch 326 provides a start command on the occasion of an automatic mode and also provides a teaching command on the occasion of a manual mode. Accordingly, if and when the start switch 326 is operated in the manual mode, the position information of the respective axes at that time is loaded in the random access memory 404 included in the computer 400.

The display portion 301 comprises a mode display lamp 302, which includes lamps $302_m$, $302_t$ and $302_a$. The respective lamps $302_m$, $302_t$ and $302_a$ are aimed to display the manual mode (M), the test mode (T) and the automatic mode (A), respectively. For example, if and when the "MODE" key is operated and then the "SHIFT" key is operated and then the "M/⑤" key, the "T/⑥" key or the "A/⑦" key is further operated in the keyboard 321, then accordingly the lamp $302_m$, $302_t$ or $302_a$ is driven for display, whereby the manual mode, the test mode or the automatic mode is displayed as set. The work number display 303 comprises a numrical value display of three digits, for example, for displaying the number of a workpiece. By operating the "WORK" key and then by operating the ten keys thereafter in the keyboard 321, the number of the workpiece at that time is set and the computer reads the corresponding user program. The step number display 304 comprises a numerical value display of three digits, for example, for displaying the number of program steps. On the occasion of the manual mode or the teaching mode, the number of teaching steps is displayed by the step number display 304. Therefore, an operator checks whether the number of programmable steps say "400" has been exceeded by looking at the display 304. In the test mode the step number display 304 displays the number of program steps designated by the ten keys operated after operation of the "STEP". At that time the program step as displayed is read out. The speed display 305 comprises a display $305_m$ on the occasion of the manual mode and a display $305_a$ on the occasion of the automatic mode. More specifically, the embodiment shown has been adapted such that the speed can be changed in the manual mode or the automatic mode. In the manual mode the speed on the occasion of the manual mode is set only through operation of the ten keys and the same is displayed by the display $305_m$. On the other hand, the speed on the occasion of the automatic mode is set by operating the "SPEED" key and then by operating the ten keys in the keyboard 321. Then the speed of execution as desired in the automatic mode is set and the same is displayed by the display $305_a$. Meanwhile, necessity of operating the "SPEED" key has been eliminated on the occasion of the manual mode, because such speed is more often set on the occasion of the manual mode as compared with the automatic mode.

Figure 11:
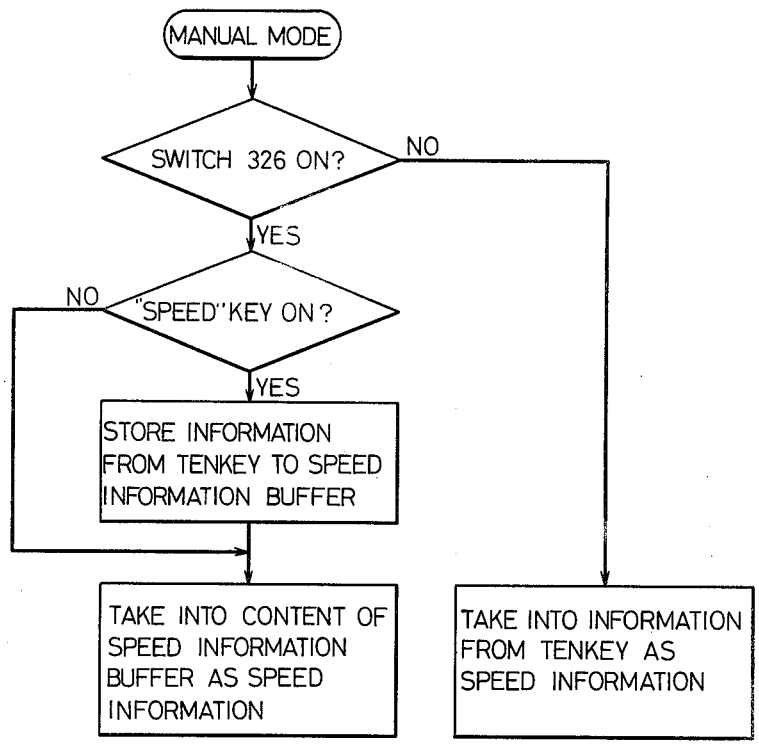
FIG. 11 is a flow diagram for depicting setting of the speed information by a "SPEED" key.

Now setting of the speed information will be described in brief. Since in a conventional robot the speed information has always been rendered effective, the same was effective even when the same is controlled by the manual operation switches with respect to the respective axes and also when the teaching switch is operated, i.e. the same is taught. On the other hand, in a conventional welding robot, for example, since there was little difference between the speed of movement through manual operation and the speed of actual movement in the automatic mode after teaching, there was no problem even when the speed information is always effective as described above. However, in a cutting robot where the present invention is employed, it is necessary to cause movement in the automatic mode faster, say 50 mm/sec, than in the manual mode (say 1 mm/sec) and, therefore, in the case where the speed information is always rendered effective as in the prior art, it is necessary to change the setting of the speed information between in the case of movement through the manual operation and in the case of the teaching, i.e. in the case of operation of the teaching switch, which makes tiresome the operation. Furthermore, when the manual operation is made at the speed set on the occasion of the teaching, the movement is too quick and a disadvantage is caused that the torch could interfere with other member, could collide with the workpiece, and the like. Therefore, the embodiment shown is adapted such that the speed information for the automatic mode and the speed information for the manual mode can be separately set. Then, when the teaching switch, i.e. the start switch 326 is operated in the manual mode, it is determined whether the "SPEED" key has been operated in the keyboard 321. If it is determined that the "SPEED" key has been operated, the speed information entered through the operation of the ten keys following the above described key is stored in the speed information buffer (which is included in the random access memory 404 but is not shown). The data stored in the above described speed information buffer is loaded as the speed information at that time. If and when the "SPEED" key has not been operated when the switch 326 is operated, the information previously stored in the speed informationn buffer is loaded at that time as the taught speed information at that time. On the other hand, on the occasion of manual operation, the speed information can be provided only through the operation of ten keys, without operating the "SPEED" key. The above described operation is shown in FIG. 11. By doing so, the speed information which is different between on the occasion of the manual operation and on the occasion of teaching can be set with ease. Accordingly, the above described problems can be all eliminated.

The display portion 301 further comprises the interpolation (division) number display 306. For example, by operating the "CLEAR/INTERPOLATE" key in the keyboard 321, the interpolation positions between the start point and the end point when the same are determined can be taught. Such number of division is displayed by the display 306. When an error occurs, the error display 307 displays the kind thereof by the numerical value code in advance set. The display 301 is further provided with the displays 308, 309 and 310 and these displays 308 to 310 each comprise a display lamp. The display lamp 308 is driven for display responsive to setting of the linear interpolation responsive to the operation of the "ERASE/LINEAR INTERPOLATE" key included in the keyboard 321. More specifically, the "ERASE/LINEAR INTERPOLATE" key is aimed to force the linear interpolation between given two points (as to be described subsequently). Furthermore, the displays 309 and 310 are driven for display responsive to selection of the selection switch 323, thereby to display either of the cutting operation and the scribing operation. The axis display 311 comprises a numerical value display of one digit and displays the respective axes by a numerical value. More specifically, when the "AXIS" key is operated and thereafter the "SHIFT" key is operated and thereafter the "Y/①" key is operated, for example, in the keyboard 321, then the Y axis is designated and the numerical value "1" is displayed by the display 311. Meanwhile, the numerical values "0", "2", "3" and "4" are displayed with respect to the remaining axes X, Z, $\alpha$ and $\beta$, respectively. The position display 312 comprises a numerical value display of five digits, for example, and is aimed to display the distance from the origin point or the angle with respect to the axis designated as described above and thus displayed with the unit mm (millimeter) or the unit deg (degree). The display lamps 313, 314, 315 and 316 are driven for display when the "SHIFT" key is operated and thereafter the "ADDITION/CALCULATION" key, the "CORRECTION/$\alpha\beta$OFF" key, the "CLEAR/INTERPOLATION" key and the "ERASE/LINEAR INTERPOLATE" key are operated in the keyboard 321. More specifically, in additionally correcting, clearing or erasing the program through operation of these keys, these displays 313, 314, 315 and 316 display the same. The display 317 displays that the computer is on calculation. Since calculation of the embodiment shown is relatively complicated, the computer being in operation is in advance taught. Accordingly, the lamp 317 is driven for display when the mode of being in calculation as taught in advance is being carried out. The displays 318 and 319 are driven for display responsive to the operation of the switches 324 and 236, respectively.

Figure 12:
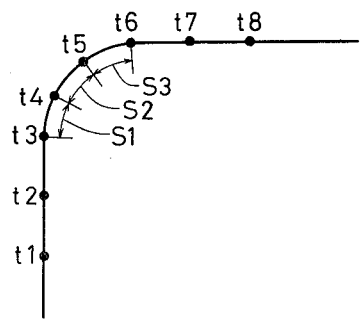
FIG. 12 is a view showing one example of a working line for depicting an interpolating operation by an operation of an "$\alpha\beta$ OFF" key.
Figure 13:
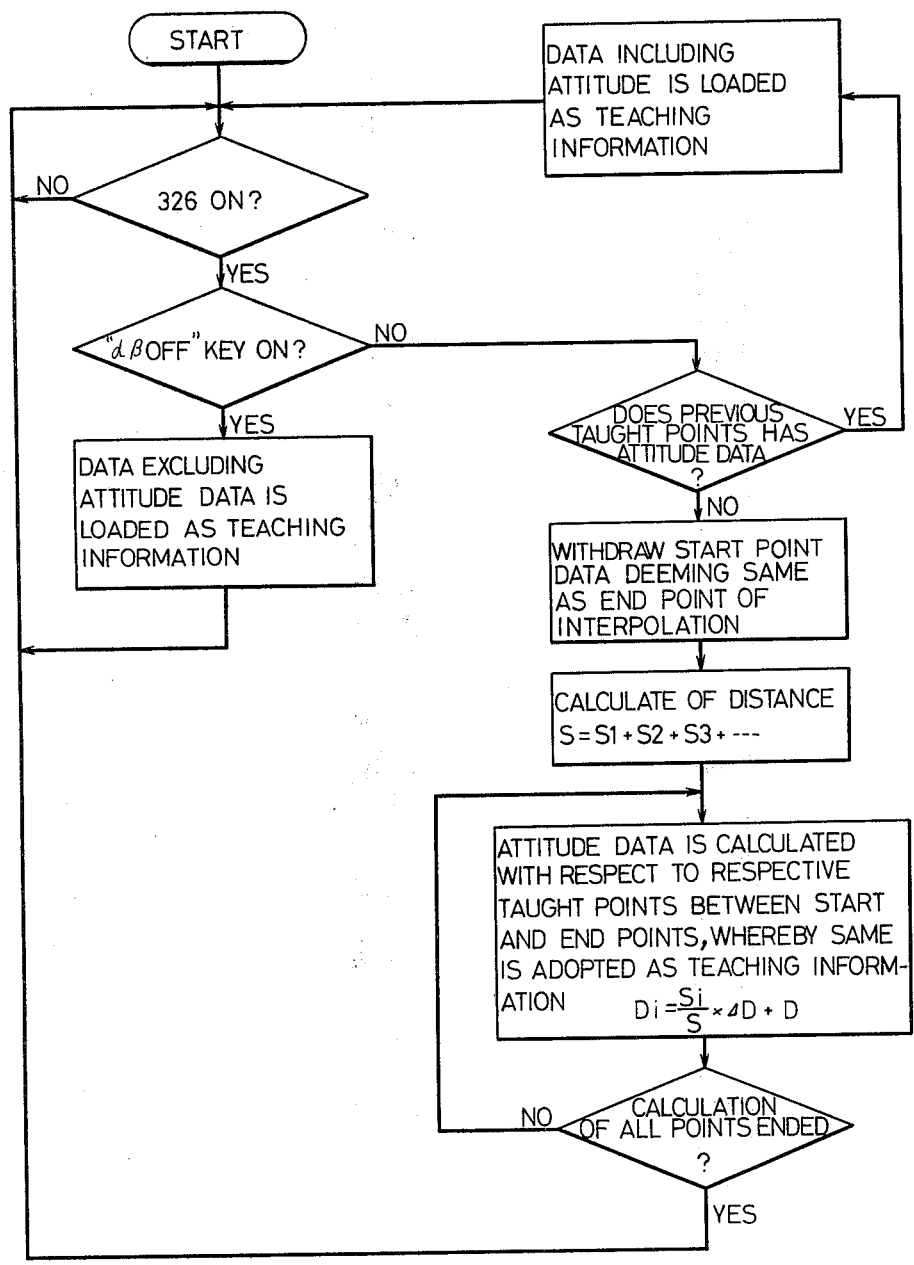
FIG. 13 is a flow diagram depicting an interpolating operation taking the example of FIG. 12.

Now before entering into a detailed description of the embodiment shown, the "CORRECTION/$\alpha\beta$OFF" key in the keyboard 321 will be briefly described with reference to FIGS. 12 and 13. Generally, the teaching operation is performed by controlling in the manual mode the positions of the five axes X, Y, Z, $\alpha$ and $\beta$ and by operating the start switch 326, whereby the positions and the attitudes of the respective axes at that time point are taught. However, most of the workpieces are of geometry for which the torch T seldom takes largely different attitudes at the respective points, which makes it possible to complete the operation by simply changing the attitudes in a linear manner. Therefore, in teaching the attitudes, only the start and end points are taught between a given point and another given point, while the remaining points between the start point and the end point are evaluated by an interpolating operation performed by a computer without teaching the attitude data. By way of an example, consider a case where a cutting line as shown in FIG. 12 is to be taught. In such a case, the points being taught t1 to t3 and t6 to t8 are taught, including the position data and the attitude data, as in the case of the usual teaching. In teaching the points being taught t4 and t5, the "CORRECTION/$\alpha\beta$OFF" key is operated, so that nothing is taught as for these axes $\alpha$ and $\beta$. More specifically, as for these points being taught t4 and t5, only the position data is taught. Then the computer is adapted to evaluate the respective distances S1, S2 and S3 based on the position data of the start point (t3) and the end point (t6). Then as for the attitude data of the points being taught t4 and t5, proportional division between the start point t3 and end point t6 is calculated in accordance with the following formula:

$$\vec{R}_{t4} = \frac{(\vec{R}_{t6} - \vec{R}_{t3}) \times S1}{S1 + S2 + S3} = \vec{R}_{t3}$$

$$\vec{R}_{t5} = \frac{(\vec{R}_{t6} - \vec{R}_{t3}) \times (S1 + S2)}{S1 + S2 + S3} + \vec{R}_{t3}$$

In accordance with the above described formula the data of the respective axes $\alpha$ and $\beta$ is evaluated. As a result, the teaching accuracy can be enhanced and the teaching time period can be shortened.

Now another approach for evaluating a formula for connecting smoothly the respective points being taught will be described with reference to FIG. 6 depicted previously. This other approach is proposed upon notice by the present inventor that the above described approach is inconvenient depending on the situation when the same is actually practiced. Meanwhile, the previously described equations (3) to (10) are incorporated in the description of this other approach.

Meanwhile, the previously described equation (10) was shown for a computer aided design method and therefore as such can not be applied to a control of a point-to-point type robot as a matter of course. Therefore, a consideration set forth in the following was added by the present inventor.

More specifically, it is first noted that the above described variable u is not a time but a parameter which is changeable from "0" to "1" without regard to a moving distance from the point i to the point i+1. Then the following consideration is given for the purpose of moving a member being controlled along the above described path at a constant speed.

Assuming the moving distance from the point i to the point i+1 to be S, the same may be expressed by the following equation (18):

$$S = \int_0^1 \left| \frac{d}{du} \vec{R}_{i,3}(u) \right| du \tag{18}$$

Assuming further that a system is employed in which a command value is renewed at each appropriate interval or time interval with respect to the moving speed and the path, and the number of commands for movement of the distance S is M, then the same is expressed by the following equation (19):

$$M = [S/\Delta S] \tag{19}$$

where the symbol [ ] means expression by an integer.

By equally dividing the movement between these points by the number M with respect to the parameter u, the m-th parameter may be expressed by the following equation (12):

$$u_m = \frac{m}{M} \quad (20)$$

where m=1 to M. The moving distance between the parameters $u_{m-1}$ and $u_m$ is expressed by the following equation (21):

$$S'_m = \int_{u_{m-1}}^{u_m} \left| \frac{d}{du} \vec{R}_{i,3}(u) \right| du \quad (21)$$

If and when it can be assumed that the division number M is sufficiently large, the above described equation (21) is modified as the following equation (22):

$$S'_m = \left| \frac{d}{du} \vec{R}_{i,3}(u) \right| u = u_m/M \quad (22)$$

Accordingly, assuming that the timing tm for giving a new command can be set in a timer, the timing tm is expressed by the following equation (23):

$$tm = S'_m/V \quad (23)$$

where V denotes a commanded moving speed. A new commanded value is commanded in accordance with such timing tm.

Meanwhile, since an integration for evaluating the above described distance S does not require so much accuracy with respect to the speed as compared with the accuracy of the position, numerical value integration may be made at appropriate rough intervals.

By making control in the above described manner, it is possible to make movement at a constant speed on a smooth path passing the points taught; however, as the movement becomes a high speed a delay in following in a control system becomes hardly negligible. In the following, therefore this will be considered.

Assuming that the commanded value given to the servo system is $\vec{Y}(t)$ and the movement of the member being controlled is $\vec{R}(t)$, then a dependency relation exists between the loop gain, inertia and the like of the servo system. It is assumed that the same is expressed in a model as shown in the following equation (24):

$$\vec{R}(s) = \frac{e^{-\tau s}}{1 + Ts} \vec{Y}(s) \quad (24)$$

By expressing the foregoing by a time region, the following equation (25) is obtained:

$$\vec{Y}(t) = \vec{R}(t - \tau) + T\frac{d}{dt}\vec{R}(t + \tau) \quad (25)$$

$$\frac{d}{du}\vec{R}(t) = \frac{d}{du}\vec{R}(t + \tau) \cdot \frac{du}{dt}$$

Accordingly, it is desired to cause the member being controlled to make movement of $\vec{R}(t)$, a command of $\vec{Y}(t)$ need be given. As described in the foregoing, a relation given by the following equations (26) and (27) exists among the moving amount S, the time period t and the parameter u:

$$S = \int_0^u \left| \frac{d}{du}\vec{R}(u) \right| du \quad (26)$$

$$t = \frac{1}{V} \int_0^u \left| \frac{d}{du}\vec{R}(u) \right| du \quad (27)$$

Accordingly, the following equations (28), (29) and (30) can be obtained:

$$\frac{du}{dt} = \frac{V}{\left| \frac{d}{du}\vec{R}(u) \right|} \quad (28)$$

$$\frac{d}{dt}\vec{R}(t) = \frac{d}{du}\vec{R}(u) \cdot \frac{du}{dt} = V \times \frac{\frac{d}{du}\vec{R}(u)}{\left| \frac{d}{du}\vec{R}(u) \right|} \quad (29)$$

$$\vec{Y}(t) = \left\{ \vec{R}(u) + \vec{T}V \times \frac{\frac{d}{du}\vec{R}(u)}{\left| \frac{d}{du}\vec{R}(u) \right|} \right\} t = t + \tau \quad (30)$$

where $\vec{R}$ and $d\vec{R}/du$ are given by the following equations (31) and (32):

$$\vec{R}_i(u) = \{(1 - 3u + 3u^2 - u^3)\vec{P}_i + (4 - 6u^2 + 3u^3)\vec{P}_{i+1} + \quad (31)$$

$$(1 + 3u + 3u^2 - 3u^3)\vec{P}_{i+2} + u^3\vec{P}_{i+3}\}/6$$

$$\frac{d}{du}\vec{R}_i(u) = \{(-1 + 2u + u^2)\vec{P}_i + (-4u + 3u^2)\vec{P}_{i+1} + \quad (32)$$

$$(1 + 2u - 3u^2)\vec{P}_{i+2} + u^2\vec{P}_{i+3}\}/2$$

As described in the foregoing, a position control in consideration of a delay in a driving system can be achieved. Although in the foregoing theoretical developments were made using several equations, in actually making such control, optimum values are obtained by experimentation based on the above described equations and stored and then the same are read out, as shown in the flow diagram.

Figure 14:
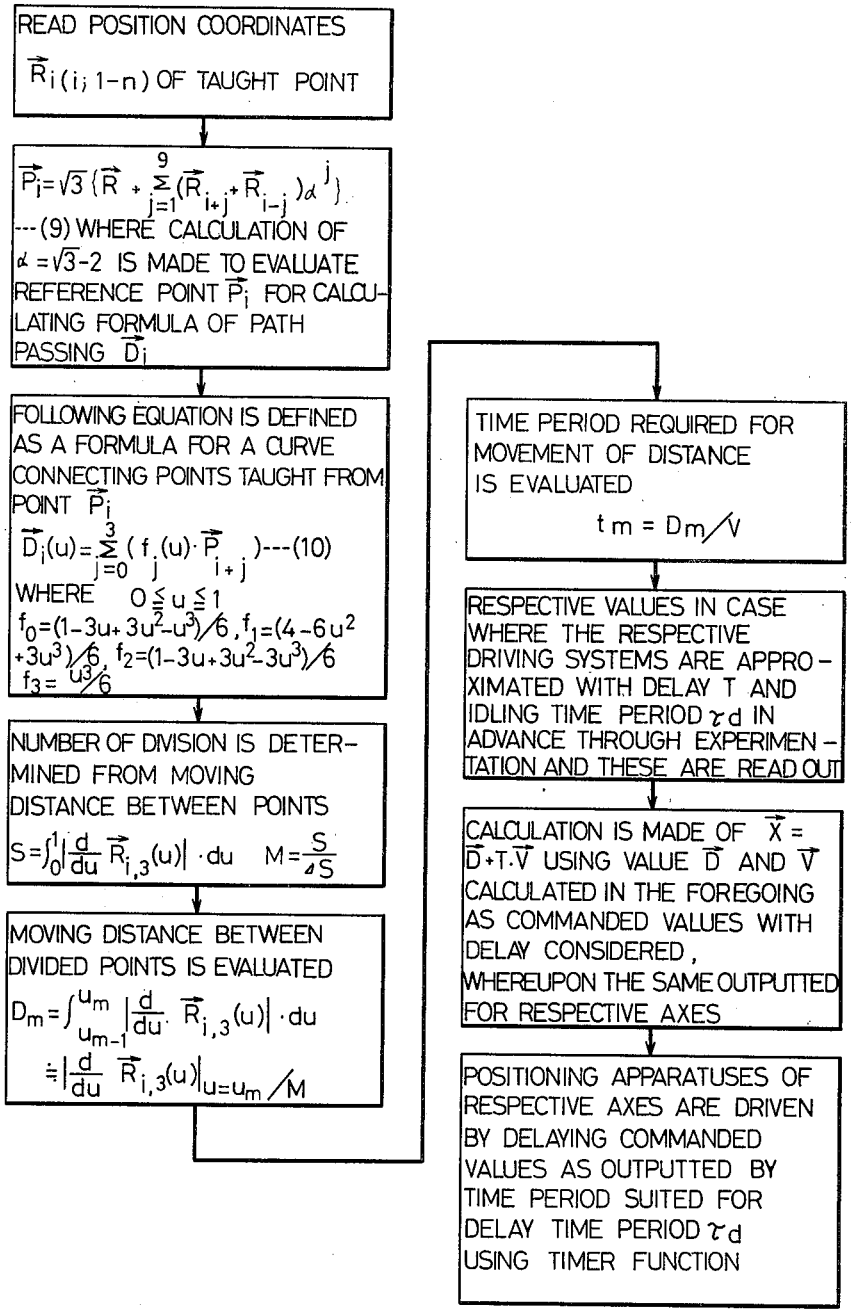
FIG. 14 is a flow diagram for depicting another embodiment for smoothing processing and for controlling a delay time.
Figure 15:
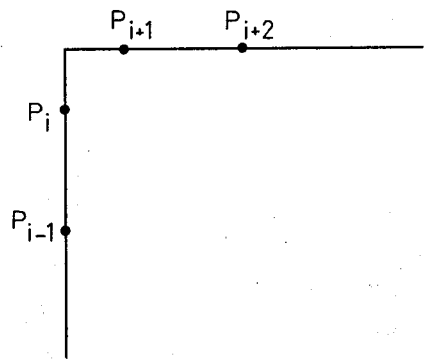
FIG. 15 is a view showing one example of a working line for depicting the background of the embodiment.
Figure 16:
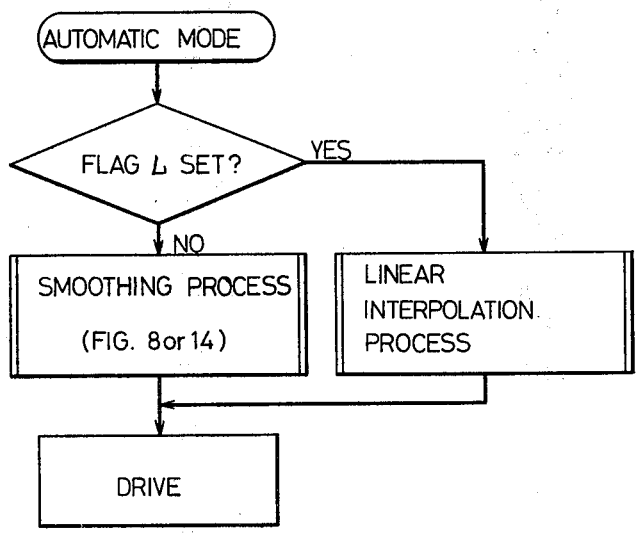
FIG. 16 is a flow diagram for depicting an operation of another embodiment of the present invention.

However, in teaching a cutting line as shown in FIG. 15, for example, a case could occur where a desired cutting line is not followed with fidelity between the points being taught $P_i$ and $P_{i+1}$, in particular, in making a position control as shown in FIG. 14. Therefore, in the embodiment shown, in teaching a cutting line as shown in FIG. 15, for example, an L flag as well as the position data of $P_i$ and $P_{i+1}$, for example, is set by operating the "LINEAR INTERPOLATION" key in the keyboard 321 (FIG. 10) for the purpose of making a control by a usual linear interpolation without making smoothing calculation between these two points. Then in reading the taught information in the automatic mode, the L flag is simultaneously read out to determine whether the L flag has been set. If the L flag has not been set, a smoothing calculation as shown in FIG. 8 or 14 described previously is made. Conversely, if the L flag has been set, then calculation of the linear interpolation is made with respect to these two points. As well known, the linear line interpolation is performed by the following equation (33):

$$\vec{P}_m = \vec{P}_i\left(\frac{M-m}{M}\right) + \vec{P}_{i+1}\frac{m}{M} \tag{33}$$

$$L = |\vec{P}_{i+1} - \vec{P}_i|$$

$$M = \frac{L}{\Delta L} \quad (\Delta L = \Delta t \cdot V_c)$$

$$1 \leq m \leq M$$

According to the above described linear interpolation, a position control is made by the linear interpolation between the points being taught $P_i$ and $P_{i+1}$ in FIG. 15, for example, whereby the problem of an angle being dulled is eliminated.

Meanwhile, the above described embodiment was described as embodied as a cutting robot of the rectangular coordinates. However, it is a matter of course that through more or less modification of FIGS. 8 and 14 previously described the same can be equally applied to robots of the polar coordinates system, a multiple node system and other control system. Furthermore, although the above described embodiment was described as applied to that of 3-dimension, the same can also be equally applied to that 5-dimension.

In the following another embodiment will be described which is preferred in eliminating a problem occurring in practicing the above described automatic position control in an automatic cutting robot.

Figure 17:
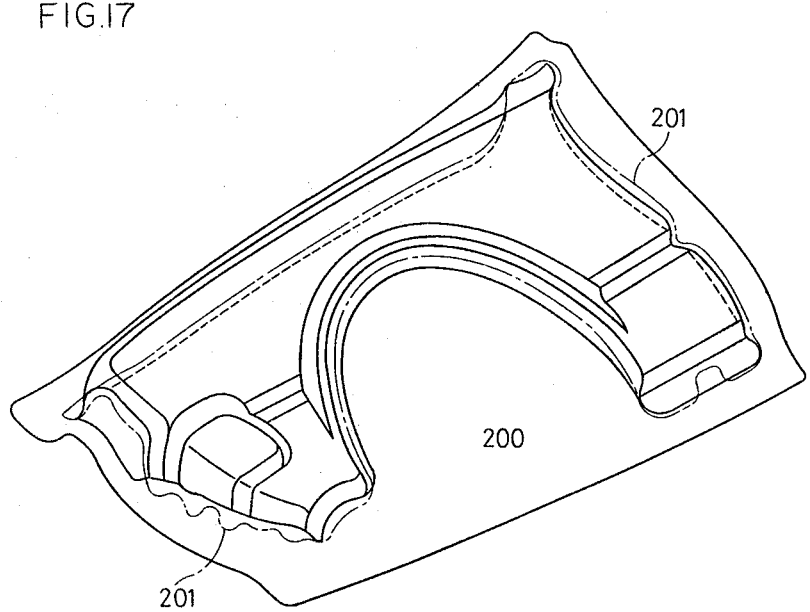
FIG. 17 is a perspective view of a workpiece as press formed which is to be cut as one example of a workpiece.
Figure 18A:
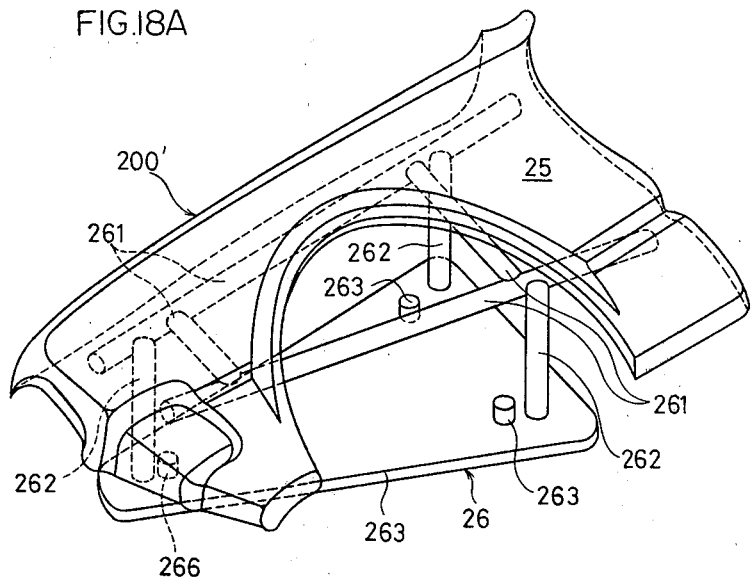
FIG. 18A is a perspective view of a mold of a workpiece as press formed.
Figure 18B:
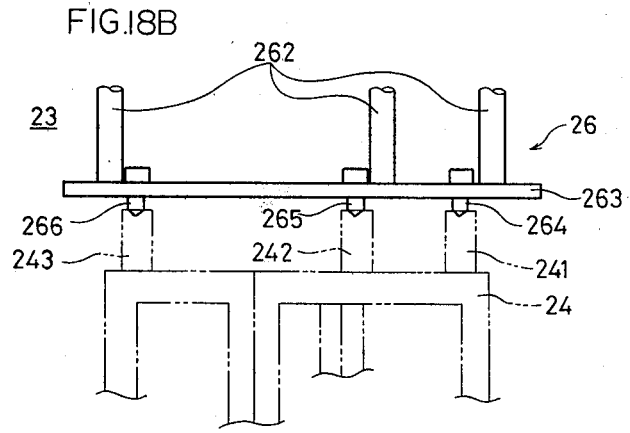
FIG. 18B is a front view, partially omitted, of the FIG. 18A workpiece.

Referring to FIGS. 17, 18A and 18B, the embodiment in description is directed to an apparatus for positioning a workpiece being press formed and is particularly aimed at an apparatus effectively positioning with accuracy a workpiece of a very thin plate which is readily flexible.

In automatically cutting or welding such workpiece as described above in a cutting robot or in a welding robot, a serious problem arises in positioning the above described workpiece. More specifically, since the workpiece is of such very thin plate, the workpiece is deformed when the same is fixed using conventional cramping means and as a result the workpiece can not be accurately positioned.

The embodiment now in description was implemented in consideration of the above described circumstances and is aimed to provide an apparatus for accurately positioning such workpiece. Now the embodiment will be described in detail in the following. Meanwhile, although the embodiment is described as embodied in an apparatus for positioning a workpiece being press formed in a cutting robot of a rectangular coordinate system, it is pointed out that the embodiment is not limited to the shown configuration embodied.

According to the embodiment, an apparatus 23 for positioning a workpiece 200 (FIG. 17) comprises components 23, 24, 25 and 26. The component 23 is a supporting base for carrying a workpiece 200 being press formed, (in the embodiment shown the same is a portion of an automobile body of a very thin plate) and is fixed to the floor beneath an arm 3 (FIGS. 9A and 9B). Meanwhile, three pipes 231, 232 and 233 are provided properly spaced apart from each other at the top of the base 23.

200' denotes a mold for the workpiece 200 being cut and press formed. The mold 200' of the embodiment shown has a concave surface on the upper side, on which a proper separating agent is coated and a time dependent setting material such as water setting material such as plaster, cement and the like is poured, whereupon a portion of a reinforcing material 26 (pipes 261, 261, ...) is dipped into the poured material 25 and, after the material 25 is set, the same is separated from the workpiece 200. Three members 262 are provided to the pipe 261 so as to protrude to be exposed from the material 25. A flat plate 263 of an approximate triangle is fixed at the tip end of the member 262. Three protrusions 264, 265 and 266 are fixed to the flat plate 263 and these protrusions 264, 265 and 266 are fixed so as to be engageable with the pipes 241 to 243.

Now the operation of the embodiment shown will be described. First the mold 200' is borne on the base 24. More specifically, the protrusions 264 and 266 are mounted to the top of the pipes 241 to 243, so that the mold 200 is positioned with respect to the base 24. Furthermore the workpiece 200 is assuredly covered on the upper surface of the material 25 of the mold 200', so that the workpiece 200 is positioned. Since generally an automobile body has concave and convex portions, the convex and concave portions of the workpiece 200 are engaged with the concave and convex portions of the material 25, so that the workpiece 200 can be extremely accurately positioned, in spite of the fact that the same is of a very thin plate which is flexible. Then by the above described control apparatus, the torch T is maintained in an optimum attitude with respect to the workpiece 200 and therefore an automatic cutting operation can be performed while the cutting point P is moved along the cutting line 201 (shown by one dotted line in FIG. 3) of the workpiece 200.

Meanwhile, since the above described automobile body comprises a plurality of workpieces being press formed, a plurality of molds are in advance fabricated for the respective workpieces and the cutting programs are stored in the control apparatus for the respective workpieces. Then by simply changing the mold for each workpiece to place the same on the base 24 and by simply selecting the desired cutting program each time the kind of the workpiece being cut is to be changed, the above described workpieces of all the kinds can be automatically cut with ease.

In the foregoing the embodiment was merely described by way of example and in the case where the workpiece 200 is not to be worked by heat such as fusion cutting, the material 25 may be of resin. Furthermore, in the case where the workpiece 200 is too little concave or convex to be accurately positioned when the workpiece 200 is placed on the mold 200', then a workpiece attracting/sucking means (not shown) such as a proper magnet or a sucking disk may be provided, so that the workpiece 200 may be assuredly fixed onto the mold 200'.

The embodiment described in the foregoing was adapted such that the mold 200' including the material 25 and the reinforcing member 26 is mounted on the supporting base 24 and the workpiece 200 is positioned by covering the workpiece 200 onto the mold 200'. Therefore, even in the case where the workpiece 200 being press formed is of a very thin plate such as for an automobile body, which is flexible, the same can always be positioned with accuracy and with ease. Therefore, the apparatus of the embodiment shown is extremely effective in automatically working a workpiece of a very thin plate, in particular.

Figure 20:
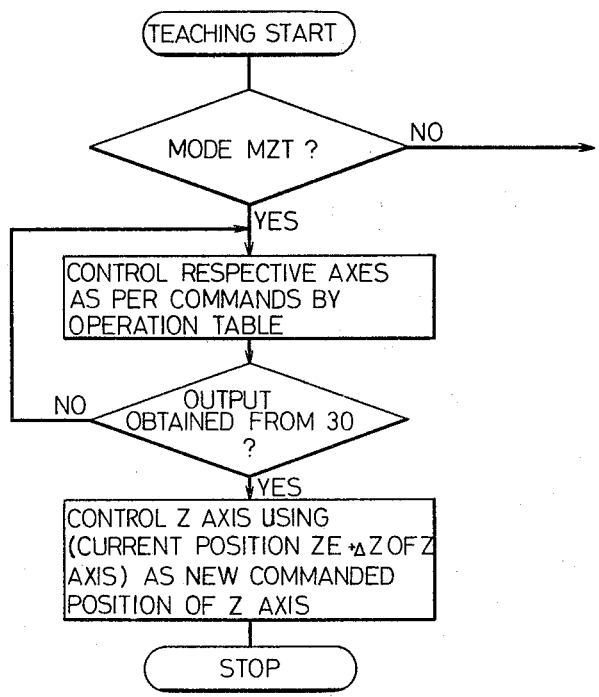
FIG. 20 is a flow diagram for depicting an operation of the embodiment employing the dummy torch.
Figure 19A:
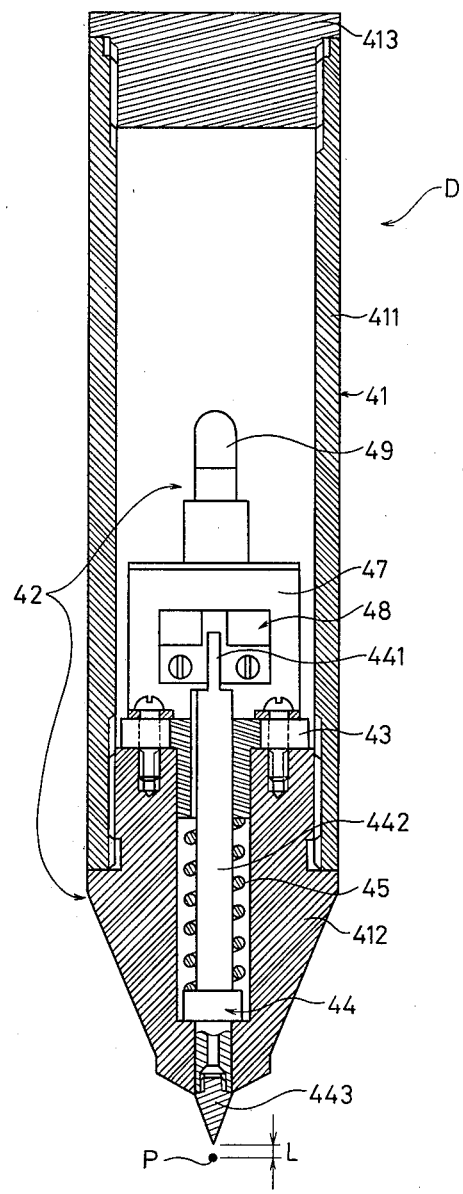
FIG. 19A is a sectional view showing one example of a dummy torch having a tapered portion mounted at the tip end of a rod.
Figure 19B:
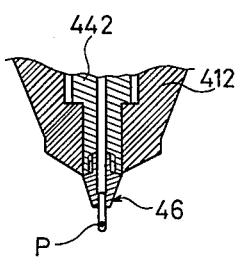
FIG. 19B is a sectional view showing a major portion of a dummy torch having a scriber mounted at the tip end of the rod.

The embodiment to be described with reference to FIGS. 19A, 19B and 20 is aimed at a dummy for a torch having the same geometry as that of a cutting/welding torch in an automatic cutting or welding robot.

Conventionally, in making a teaching operation in an automatic welding robot, for example, with a view to moving a welding torch along a welding line of a workpiece with an optimum attitude, it is sometimes necessary to provide the above described robot with a dummy in place of the torch. However, in making a teaching operation using such dummy, it is difficult to discern with a naked eye whether the position of the welding point at the tip end of the dummy has coincided with the position of the above described welding line, due to the fact that illumination in a factory is insufficient or the workpiece is glossy, with the result that the teaching operation is tiresome.

The embodiment in description was implemented in consideration of the above described circumstances and is aimed at provision of a dummy for cutting/welding torch which is capable of a teaching operation with ease even in the case where the ambient illumination is insufficient or the workpiece is glossy. Now the embodiment will be described in detail in the following. Meanwhile, although the embodiment is described as embodied in a dummy for a welding torch in an automatic welding robot (of a rectangular coordinates system), it is pointed out that application of the same is not limited to the embodiment shown.

In the case of the embodiment shown, the workpiece 200 is as shown in FIG. 17 and the same is supported by a mechanism shown in FIGS. 18A and 18B. Now referring to FIGS. 19A and 19B, "D" denotes a dummy of substantially the same geometry as a plasma torch T. "41" denotes a dummy main body, which comprises an intermediate cylindrical member 411, a tip end hollow member 412 and a rear end lid 413, these components 411, 412 and 413 being coupled by being screwed as shown in FIG. 19A. "43" denotes a hollow auxiliary member fixed to the rear end portion of the member 412. "44" denotes a tapered rod loosely fitted into the respective hollow portions of the members 412 and 43 and urged to be protruded to the tip end of the main body 11 by means of a spring 45 (and fixed to be non-rotatable) with respect to the member 43. Meanwhile, the rod 44 of the embodiment shown comprises a hollow main rod portion 442 formed in a plate form 441 at the rear end portion and a tapered portion 443 detachable at the tip end. Furthermore, when the tapered portion 443 is removed, instead the writing means 46 (in the embodiment shown a pen of a ball point pen) can be mounted as shown in FIG. 19B. The position of the welding point P of the dummy in D the case where the tapered portion 443 is mounted may be positioned at the location spaced part forward by the distance L (in actuality 0.5 mm) from the tip end of the tapered portion 443 and the position of the cutting point of the dummy in the case where the writing member 46 is mounted is positioned to the location slightly spaced rearward from the pen tip point portion of the ball point pen 46. "47" denotes an electric component fixing plate which is formed integrally of the member 43. "48" denotes a rod retraction detector (in the case of the embodiment a photosensor) provided to the plate 47 at the position where the plate portion 441 of the rod 44 may be sandwiched. Meanwhile, the detector 48 has been adapted to provide a signal when the rod 44 is retracted approximately 1 mm from a normally protruded position. "49" denotes a light source mounted to the plate 47. Meanwhile, the embodiment shown is structured such that the member 412 is formed with a light transmissive material and the member 412 is covered with a reflecting material (coated with a silver colored paint, for example) excluding the tip end portion of the member 412, so that the same serves as a light transmissive member for transmitting the light from the light source 49 to the vicinity of the tip end of the rod 44. Thus the light source 49 and the member 412 constitute an illuminating means 42 for illuminating the vicinity of the tip end of the rod 44. Furthermore the embodiment is adapted to be capable of setting the teaching mode MZT while the above described detector 48 is in an operable state. To that end, the mode selection switch 331 of the operation table 300 shown in FIG. 3, for example, is structured to be capable of setting selectively the mode MZT in addition to the previously described modes M, MT, ST, TE and A. At the same time, the signal from the above described detector 48 is fed to the computer 400 (FIG. 2) through the bus 500.

In the following the operation of the embodiment will be described with reference to FIG. 20. First the mold 200' of the workpiece 200 as shown in FIG. 18A is placed on a predetermined position on the pipes 241 to 243 of the supporting base 24 and then the workpiece 200 is covered on the above described mold 200' and the same is positioned and fixed. Meanwhile, the cutting line 201 is written in advance on the workpiece 200 and the dummy D is fixed to the fixing means 15 in place of the torch T. The tapered portion 443 is mouned to the tip end of the rod 44 of the dummy D, as shown in FIG. 19A.

First the operator selects the switch 331 to the mode MZT. At that time the light source 49 has been turned on. Then the switches $334_x$ to $334_\phi$ are operated so that the dummy is manually position controlled for the respective control axes and the position of the cutting point P (FIG. 19A) is brought to the required point being taught on the cutting line 201 (FIG. 17), whereupon the switch 333 is depressed. Then the computer 400 receives the outputs of the respective position sensors (corresponding to $605_x$ in FIG. 4) at that time, thereby to store the same in the memory 404 as the position information. The operator thus teaches the positions of a plurality of points being taught and commanded speeds by the switch 332, thereby to store the same as a series of user programs in the memory 403.

In making these teaching operations, since the light source 49 has been turned on and the member 412 is made of a light transmissive material the outer surface of which has been coated with a silver colored paint, excluding the tip end portion, the light beam from the light source 49 sufficiently illuminates the vicinity of the tip point of the rod 44, i.e. the vicinity of the position of the cutting point P. If and when the illumination in the factory is not sufficient or the surface of the workpiece 200 is glossy, then it is very difficult to make a teaching operation of positioning the cutting point P to the required point on the cutting line 201 without the illuminating means 42; however, employment of the illuminating means 42 much facilitate the teaching operation. Furthermore, in the teaching operation, if the tapered portion 443 comes in contact with the workpiece 200 and the rod 44 is retracted more than 1 mm, then the detector 48 detects interruption by the plate portion 441 to provide a signal. The computer 400 is responsive to the output signal to command a new position in the Z axis direction (of the current position $ZE+\Delta Z$ in the Z axis) in preference to the command in the Z axis direction through operation of the switch $334_x$ by the operator. Meanwhile, ZE is an output value from the position sensor of the Z axis positioning apparatus $600_z$ when the output is obtained from the detector 48 and $\Delta Z$ is a predetermined value stored in advance in the memory 403. Thus, as soon as the dummy D comes in contact with the workpiece 200 and the rod 44 is retracted more than 1 mm, the same is raised only by $\Delta Z$ and the dummy D is released from the above described contact. Accordingly, even if the cutting line 201 is curved in a 3-dimension manner, the operator can manually control the position in the X and Y directions without anxiety as to the position in the Z axis direction. Furthermore, when the dummy D is raised only by the above described $\Delta Z$, the operator may fix the same as it stand with respect to the X and Y axes and may lower the dummy D by operating the same only in the Z axis direction. Thus the teaching operation is facilitate, as is readily understood.

If and when the teaching operation is completed, this time the switch 331 is turned to the mode TE and the program prepared by the teaching is executed in an attempt to make dummy D move on a test basis with respect to the workpiece 200. At that time the tapered portion 443 is in advance removed from the main rod portion 442 and instead the writing means 46 is instead mounted to the main rod portion 442, as shown in FIG. 19B. Meanwhile, the color of writing means 46 is selected to be different from the color of the line in advance drawn as the cutting line 201 at the beginning. Then upon depression of the switch 333, the dummy D is position controlled in accordance with the above described program. The position of the cutting point P of the dummy D at that time has been positioned slightly rearward of the tip end portion of the writing means 46 and therefore the dummy D moves as the tip end of the writing means 46 is in contact with the surface of the workpiece 200. Accordingly, a line is drawn as a moving locus of the tip end portion of the writing means 46 on the surface of the workpiece 200 and, by checking whether this line coincides with the line drawn at the beginning as a line being cut, accuracy of the above described position being taught can be confirmed. In the case where it is necessary to amend the position, it is easy to determine how much should be amended.

The foregoing description is only by way of an example and the illuminating means 42 may be formed such that the member 412 is formed as a light transmissive material and the rod 44 is formed as a light transmissive material. In such a case, it is not necessary to coat a reflecting material on the outer surface of the main body 41.

As described in the foregoing, the embodiment was structured such that the rod 44 is retractile at the tip end portion of the main body 41 and is inserted to be urged to be protruded by the spring 45 and the vicinity of the tip end of the rod 44 is illuminated by the illuminating means 42. Therefore, in making a teaching operation, even if an operator erroneously operates the apparatus to make the tip end of the dummy D collide with the workpiece 200, the rod 44 is only retracted against the spring 45 and the dummy D or the fixing member 15 is not damaged nor the position of the point P is missaligned. Furthermore, even in the case where the illumination in a factory is not sufficient or the workpiece 200 is glossy, an operation for making the position of the point P coincide with the position on the line 201 with a naked eye becomes very easy and the meritrious effect of the embodiment is remarkable.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic position controlling apparatus of a playback system, comprising
   means for teaching positional data of a plurality of points,
   driving means responsive to said positional data of said plurality of points, as taught, for driving an apparatus to be position controlled,
   smoothing means acting on said driving means, said smoothing means including
   means for evaluating a formula of a curve smoothly connecting said taught positional data of a plurality of points associated with each other,
   means responsive to said curve formula for evaluating a commanded position for every predetermined time interval less than the response time period of said driving means, and
   means for correcting said commanded position according to a time delay in the response characteristic of said driving means.

2. An automatic position controlling apparatus in accordance with claim 1, wherein
   said correcting means comprises means for approximating, with a first order delay characteristic, the time delay of the response characteristic of said driving means, for making corrections according to said approximated first order delay.

3. An automatic position controlling apparatus in accordance with claims 1 and 2, wherein
   said correcting means comprises dead time correcting means for correcting said respective commanded positions in consideration of a dead time of said driving means.

4. An automatic position controlling apparatus in accordance with claim 3, wherein
   said dead time correcting means comprises
   storage means receiving information concerning said respective commanded positions and having a plurality of storing regions, and
   clockpulse generating means for loading in succession said information concerning the commanded positions loaded in said storage means in said respective storing regions for a time period corresponding to said dead time period of said system of said means being controlled.

5. An automatic position controlling apparatus in accordance with claims 1, 2 and 3, which further comprises
   detecting means for detecting whether a next successive position point following a previous position controlled point is a point for which disenabling of the smoothing means has been specified, and
   disenabling means responsive to detection by said detecting means that the next point being position controlled is said specified point for disenabling said smoothing means.

6. An automatic position controlling apparatus in accordance with claim 5, which further comprises
   identifying symbol teaching means for teaching an identifying symbol representing whether the next point being position controlled is said specified point as well as commanded position information in performing said teaching operation, and wherein said detecting means is adapted to detect said identifying symbol.

7. An automatic position controlling apparatus in accordance with claim 5, wherein said disabling means comprises linear interpolation means responsive to detection by said detecting means that said next point being position controlled is a specified point for providing commanded positions to said next point by linear interpolation.

8. An automatic position controlling apparatus in accordance with claim 1, wherein said apparatus being controlled is provided to be rotatable about a predetermined rotation axis, and a working point of said apparatus being controlled is positioned on said rotation axis.

9. An automatic position controlling apparatus in accordance with claim 8, which further comprises a further rotation axis provided at a predetermined angle with respect to said rotation axis and to be structured to be rotatable, and wherein said means being controlled is provided at a predetermined angle with respect to said further rotation axis, and a working point of said apparatus being controlled is positioned on said two rotation axes.

10. An automatic position controlling apparatus of a playback system, comprising means for teaching positional data of a plurality of points, driving means responsive to said positional data of said plurality of points, as taught, for driving an apparatus to be position controlled, smoothing means acting on said driving means, said smoothing means including means for evaluating a formula of a curve smoothly connecting said taught positional data of a plurality of points associated with each other, means responsive to said evaluated curve formula for evaluating a commanded position for every predetermined time interval less than the response time period of said driving means, means for correcting said commanded position according to a time delay in the response characteristic of said driving means, detecting means for detecting whether the next successive taught points is a point previously specified for disenabling said smoothing means, and disenabling means responsive to said detection means for disenabling said smoothing means when one of said previously specified points is detected.

11. An automatic position controlling apparatus of a playback system, comprising means for teaching positional data of a plurality of points, driving means responsive to said positional data of said plurality of points, as taught, for driving an apparatus to be position controlled, smoothing means acting on said driving means, said smoothing means including means for evaluating a formula of a curve smoothly connecting said taught positional data of a plurality of points associated with each other, means responsive to said evaluated curve formula for evaluating a commanded position for every predetermined time interval less than the response time period of said driving means, means for correcting said evaluated commanded position according to a time delay in the response characteristic of said driving means, wherein said apparatus being controlled comprises torch means and further comprises dummy torch means for replacement of said torch means, said dummy torch means comprising a hollow torch dummy main body, a tapered rod loosely fitted to be protrusile/retractile with respect to the tip end of said main body and urged to be protruded, and illuminating means including a light source provided in the hollow portion of said main body and a light transmissive member guiding the light beam from said light source to the vicinity of the tip end of said rod.

12. An automatic position controlling apparatus in accordance with claim 11, wherein said main body is made of a light transmissive material, whereby said main body is light transmissive.

13. An automatic position controlling apparatus in accordance with claim 12, wherein said illuminating means comprises a reflecting member formed on the outer surface of said main body of said light transmissive material, excluding the tip end portion of said main body for guiding the light beam from said light source to the vicinity of the tip end of said rod.

14. An automatic position controlling apparatus in accordance with claim 11, wherein said rod is made of a light transmissive material, whereby said rod is light transmissive.

15. An automatic position controlling apparatus in accordance with claim 11, wherein said rod is structured such that the tapered tip end thereof is detachable and writing means is adaptable thereto in place of said tapered tip end, whereby the tip end position when said writing means is adapted slightly protrudes as compared with the tip end position when said tapered tip end position is mounted.

16. An automatic position controlling apparatus in accordance with claim 11, which further comprises a retractile detector of said rod is received in the hollow portion of said main body.

17. An automatic position controlling apparatus of a playback system, comprising means for teaching positional data of a plurality of points, driving means responsive to said positional data of said plurality of points, as taught, for driving an apparatus to be position controlled, smoothing means acting on said driving means, said smoothing means including means for evaluating a formula of a curve smoothly connecting said taught positional data of a plurality of points associated with each other, means responsive to said evaluated curve formula for evaluating a commanded position for every predetermined time interval less than the response time period of said driving means, means for correcting said evaluated commanded position according to a time delay in the response characteristic of said driving means, wherein said automatic position-controlling apparatus is formed as a working apparatus, said working apparatus being adapted to, by means of said apparatus being controlled, work a press formed workpiece, and which further comprises means for positioning said press formed workpiece, said workpiece positioning means comprising a mold for said workpiece being press formed obtained by pouring a time dependent settable material into said workpiece as press formed and by dipping a portion of a reinforcing member in said poured material, whereupon said reinforcing member as exposed from said material is adapted to be mounted on a predetermined position of supporting base.

18. An automatic position controlling apparatus in accordance with claim 17, wherein said time dependent settable material comprises a water settable material such as plaster, cement or the like.

19. An automatic position controlling apparatus in accordance with claim 17, wherein said time dependent settable material comprises resin.

20. An automatic position controlling apparatus in accordance with claim 17, wherein said mold comprises means for sucking/attracting said workpiece as press formed.

21. An automatic position controlling apparatus in accordance with claim 17, wherein said reinforcing member is structured to be detachable with respect to said supporting base.

22. An automatic position controlling apparatus of a playback system, comprising means for teaching positional data of a plurality of points, driving means responsive to said positional data of said plurality of points, as taught, for driving means to be position controlled, means for evaluating a formula of a curve smoothly connecting said plurality of position points, as taught, associated with each other, means responsive to said evaluated curve formula for evaluating a commanded position for every predetermined time interval smaller than the response time period of said driving means, means for correcting said evaluated commanded position in consideration of a time delay in the response characteristic of said driving means, a base, an arm carried at one end by said base to be movable in the left/right direction, a moving member carried by said arm to be movable in the forward/rearward direction, a column carried by said moving member to be movable in the upward/rearward direction and for supporting said apparatus being controlled, a spring balancer fixed to one end of said arm, first and second pulleys separately supported by said moving member by means of a left-right directional axis, a third pulley supported by said column by means of a left/right directional axis, and an extension of said balancer being fixed at the tip end thereof to the other end of said arm while the same is entrained midway around said first, third and second pulleys in the order described, a taking up force of said extension of said balancer being approximately a half of the total weight of said column and the components carried by said column.

* * * * *